(12) United States Patent
Kishi

(10) Patent No.: US 10,015,368 B2
(45) Date of Patent: Jul. 3, 2018

(54) CALIBRATION SYSTEM, CALIBRATION METHOD, AND IMAGE FORMING APPARATUS

(71) Applicant: KYOCERA Document Solutions Inc., Osaka (JP)

(72) Inventor: Yoshitaka Kishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 21 days.

(21) Appl. No.: 15/273,810

(22) Filed: Sep. 23, 2016

(65) Prior Publication Data

US 2017/0094130 A1    Mar. 30, 2017

(30) Foreign Application Priority Data

Sep. 29, 2015  (JP) ................................ 2015-191036
Sep. 29, 2015  (JP) ................................ 2015-191045

(51) Int. Cl.
*H04N 1/60* (2006.01)
*H04N 1/56* (2006.01)
*H04N 1/00* (2006.01)

(52) U.S. Cl.
CPC ....... *H04N 1/6055* (2013.01); *H04N 1/00251* (2013.01); *H04N 1/00307* (2013.01); *H04N 1/6033* (2013.01); *H04N 2201/0094* (2013.01)

(58) Field of Classification Search
None
See application file for complete search history.

(56) References Cited

U.S. PATENT DOCUMENTS

| 6,008,907 A * | 12/1999 | Vigneau | H04N 1/6033 348/179 |
| 8,976,413 B2 * | 3/2015 | Iwafuchi | B41J 2/2128 358/1.9 |
| 2002/0051002 A1 * | 5/2002 | Kumada | H04N 1/6033 345/600 |
| 2007/0030505 A1 * | 2/2007 | Ito | H04N 1/6019 358/1.9 |

(Continued)

FOREIGN PATENT DOCUMENTS

| JP | 2006-222552 A | 8/2006 |
| JP | 2010-226562 A | 10/2010 |

*Primary Examiner* — Madelein T Nguyen
(74) *Attorney, Agent, or Firm* — Studebaker & Brackett PC

(57) ABSTRACT

A calibration system includes an imaging device, an image forming apparatus, and a table generating section. The image forming apparatus prints a test chart containing patches of colors on a sheet. The imaging device captures images of a reference chart containing patches corresponding to the patches in the test chart and the test chart on the sheet together to generate a picture. The table generating section: calculates a weighting coefficient for each of the patches in the picture based on a color intensity of the patch; calculates, as a representative value for each of gradations of color values of the patches in the picture, a weighted average of color values of the patches in the gradation based on the weighting coefficient; and generates a gamma correction table for correcting gradation characteristics of the image forming apparatus to gradation characteristics in accordance with the reference chart based on the representative values.

12 Claims, 24 Drawing Sheets

(56) References Cited

U.S. PATENT DOCUMENTS

| | | | | |
|---|---|---|---|---|
| 2013/0229671 A1* | 9/2013 | Yokozawa | ............ | H04N 1/6033 |
| | | | | 358/1.9 |
| 2014/0233049 A1* | 8/2014 | Takemura | ............ | H04N 1/0005 |
| | | | | 358/1.12 |
| 2015/0116740 A1* | 4/2015 | Miyanaga | ............ | H04N 1/6008 |
| | | | | 358/1.9 |
| 2015/0158309 A1* | 6/2015 | Fujii | .................... | G01N 21/251 |
| | | | | 347/19 |
| 2015/0350484 A1* | 12/2015 | Suzuki | ................. | H04N 1/2338 |
| | | | | 358/474 |
| 2016/0248942 A1* | 8/2016 | Horita | .................. | H04N 1/6019 |
| 2016/0301830 A1* | 10/2016 | Shibata | ................ | H04N 1/6036 |
| 2017/0039458 A1* | 2/2017 | Kuwada | ............. | G06K 15/1802 |
| 2017/0085726 A1* | 3/2017 | Tominaga | .......... | H04N 1/00045 |

\* cited by examiner

CALIBRATION SYSTEM, CALIBRATION METHOD, AND IMAGE FORMING APPARATUS

INCORPORATION BY REFERENCE

The present application claims priority under 35 U.S.C. § 119 to Japanese Patent Application No. 2015-191036, filed on Sep. 29, 2015 and Japanese Patent Application No. 2015-191045, filed on Sep. 29, 2015. The contents of these applications are incorporated herein by reference in their entirety.

BACKGROUND

The present disclosure relates to a calibration system, a calibration method, and an image forming apparatus for correcting gradation characteristics.

In image forming apparatuses such as printers and multifunction peripherals (MFPs), calibration is performed for correction of input/output characteristics, that is, so-called gamma correction in order to compensate for changes due to aging and the like. A known calibration method involves measuring current output colors using a scanner mounted in an MFP or a density sensor in an image forming apparatus and correcting input/output characteristics such that the color values of the output colors will be desired color values.

However, an expensive, dedicated colorimeter such as a spectrocolorimeter is needed in order to match color values of output colors from an image forming apparatus with color values of output colors from a different type of image forming apparatus. It is however challenging for ordinary users to prepare and make full use of such a dedicated colorimeter.

In order to solve such a problem, calibration systems are offered that allow simple and low-cost calibration by using an imaging device such as a digital camera or a camera phone as a device alternative to the dedicated colorimeter.

In one example of the calibration systems, first, an imaging device captures an image of a reference chart containing patches of a plurality of colors together with an image of a test chart that corresponds to the reference chart and that is printed by an image forming apparatus. Next, gradation characteristics of the image forming apparatus are corrected based on RGB values of the respective patches in the reference chart and the test chart in a picture generated through the image capture by the imaging device.

In another example of a calibration system, first, an imaging device separately captures an image of a reference chart containing patches of a plurality of colors and an image of a test chart that corresponds to the reference chart and that is printed by an image forming apparatus. Next, first correction values are calculated based on color values of the patches in the reference chart in the first image captured by the imaging device and on color values of the patches in the test chart in the second image captured by the imaging device. Furthermore, second correction values are calculated based on the color values of the patches in the reference chart in the first image and on reference color values prestored in the image forming apparatus. Next, gradation characteristics of the image forming apparatus are corrected based on the first correction values and the second correction values.

SUMMARY

A calibration system according to a first aspect of the present disclosure includes an imaging device, an image forming apparatus, and a table generating section. The image forming apparatus prints a test chart containing patches of a plurality of colors on a sheet. The table generating section generates a gamma correction table for correcting gradation characteristics of the image forming apparatus to gradation characteristics in accordance with a reference chart containing patches of a plurality of colors corresponding to the colors of the patches in the test chart. The imaging device captures images of the reference chart and the test chart on the sheet together to generate a picture. The table generating section: calculates a weighting coefficient for each of the patches in the test chart and the patches in the reference chart in the picture based on a color intensity of the patch; calculates, as a representative value for each of gradations of color values of the patches in the test chart and gradations of color values of the patches in the reference chart, a weighted average of color values of the patches in the gradation based on the weighting coefficient; and generates the gamma correction table based on the representative values calculated for the test chart and the reference chart.

A calibration method according to a second aspect of the present disclosure includes: printing, by an image forming apparatus, a test chart containing patches of a plurality of colors on a sheet; capturing, by an imaging device, images of a reference chart and the test chart on the sheet together to generate a picture, the reference chart containing patches of a plurality of colors corresponding to the colors of the patches in the test chart; and generating a gamma correction table for correcting gradation characteristics of the image forming apparatus to gradation characteristics in accordance with the reference chart. The generating a gamma correction table includes: calculating a weighting coefficient for each of the patches in the test chart and the patches in the reference chart in the picture based on a color intensity of the patch; calculating, as a representative value for each of gradations of color values of the patches in the test chart and gradations of color values of the patches in the reference chart, a weighted average of color values of the patches in the gradation based on the weighting coefficient; and generating the gamma correction table based on the representative values calculated for the test chart and the reference chart.

An image forming apparatus according to a third aspect of the present disclosure prints a test chart containing patches of a plurality of colors on a sheet. The image forming apparatus includes a table generating section. The table generating section generates a gamma correction table for correcting gradation characteristics of the image forming apparatus to gradation characteristics in accordance with a reference chart containing patches of a plurality of colors corresponding to the colors of the patches in the test chart. The table generating section: calculates a weighting coefficient for each of the patches in the test chart and the patches in the reference chart in a picture based on a color intensity of the patch, the picture being generated through an imaging device capturing images of the reference chart and the test chart on the sheet together; calculates, as a representative value for each of gradations of color values of the patches in the test chart and gradations of color values of the patches in the reference chart, a weighted average of color values of the patches in the gradation based on the weighting coefficient; and generates the gamma correction table based on the representative values calculated for the test chart and the reference chart.

DETAILED DESCRIPTION

The following describes embodiments of the present disclosure using the accompanying drawings.

First Embodiment

First, description is given of a configuration of a calibration system according to a first embodiment.

Figure 1:
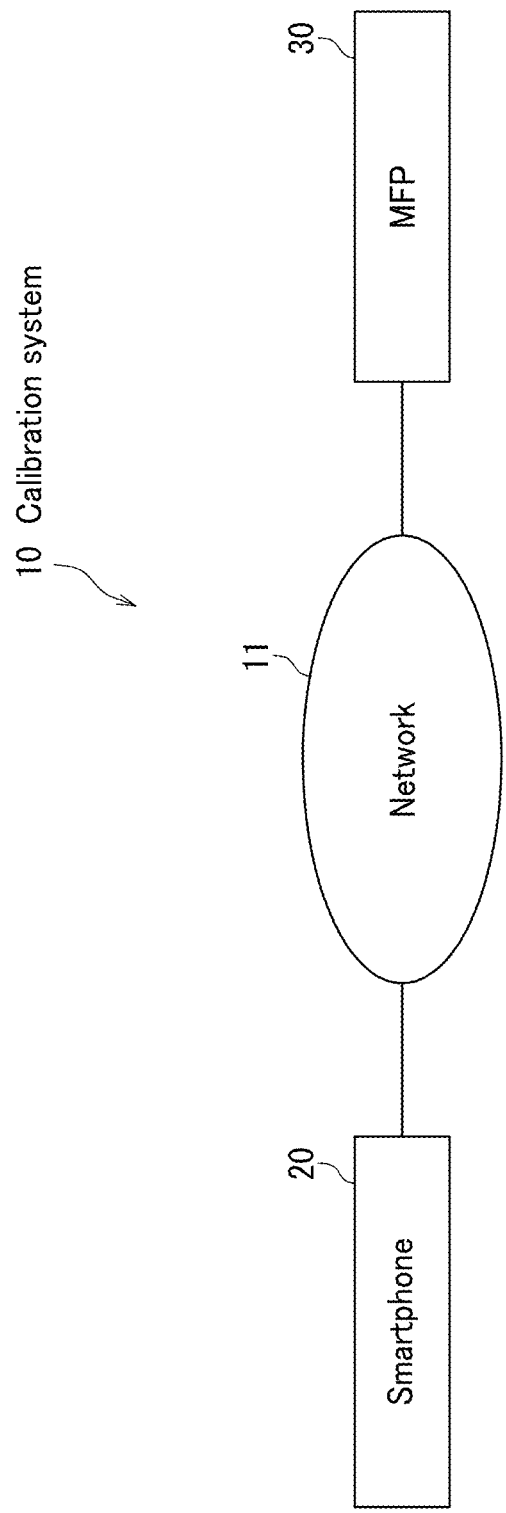
FIG. 1 is a block diagram of a calibration system according to a first embodiment of the present disclosure.

FIG. 1 is a block diagram of a calibration system 10 according to the present embodiment.

As illustrated in FIG. 1, the calibration system 10 includes a smartphone 20 serving as an imaging device and a multifunction peripheral (MFP) 30 serving as an image forming apparatus. The smartphone 20 and the MFP 30 are communicable with each other. The smartphone 20 and the MFP 30 may be communicable with each other via a network 11 such as a local area network (LAN) or the Internet. Alternatively, the smartphone 20 and the MFP 30 may be directly communicable with each other using a communication cable such as a universal serial bus (USB) cable without being routed via the network 11.

Figure 2:
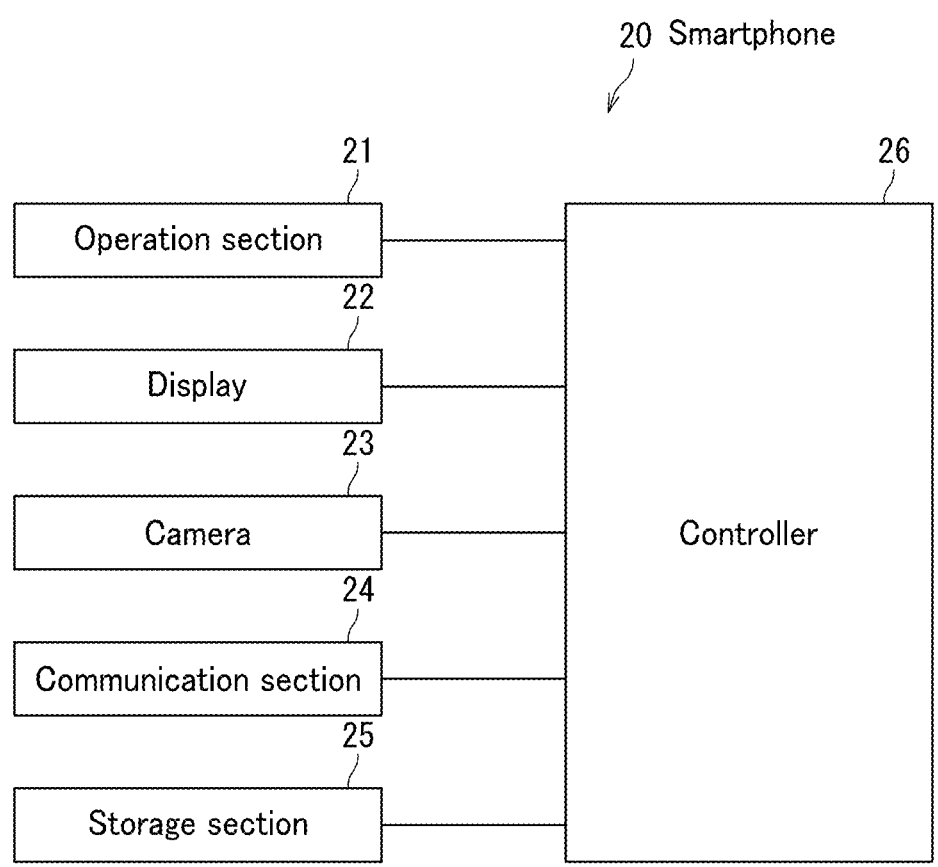
FIG. 2 is a block diagram illustrating an example of a smartphone illustrated in FIG. 1.

FIG. 2 is a block diagram of the smartphone 20.

As illustrated in FIG. 2, the smartphone 20 includes an operation section 21, a display 22, a camera 23, a communication section 24, a storage section 25, and a controller 26. The operation section 21 is an input device such as buttons that receive input of various operations. The display 22 is a display device that displays various types of information, such as a liquid crystal display (LCD). The communication section 24 is a communication device that performs communication with external devices via the network 11 (see FIG. 1) or a communication cable. The storage section 25 is a non-volatile storage device that stores therein various types of data, such as semiconductor memory. The controller 26 performs overall control of the smartphone 20.

The controller 26 for example includes a central processing unit (CPU), read only memory (ROM) that stores various types of data, and random access memory (RAM) that is used as a work area of the CPU of the controller 26. The CPU of the controller 26 executes a program stored in the ROM of the controller 26 or in the storage section 25.

Figure 3:
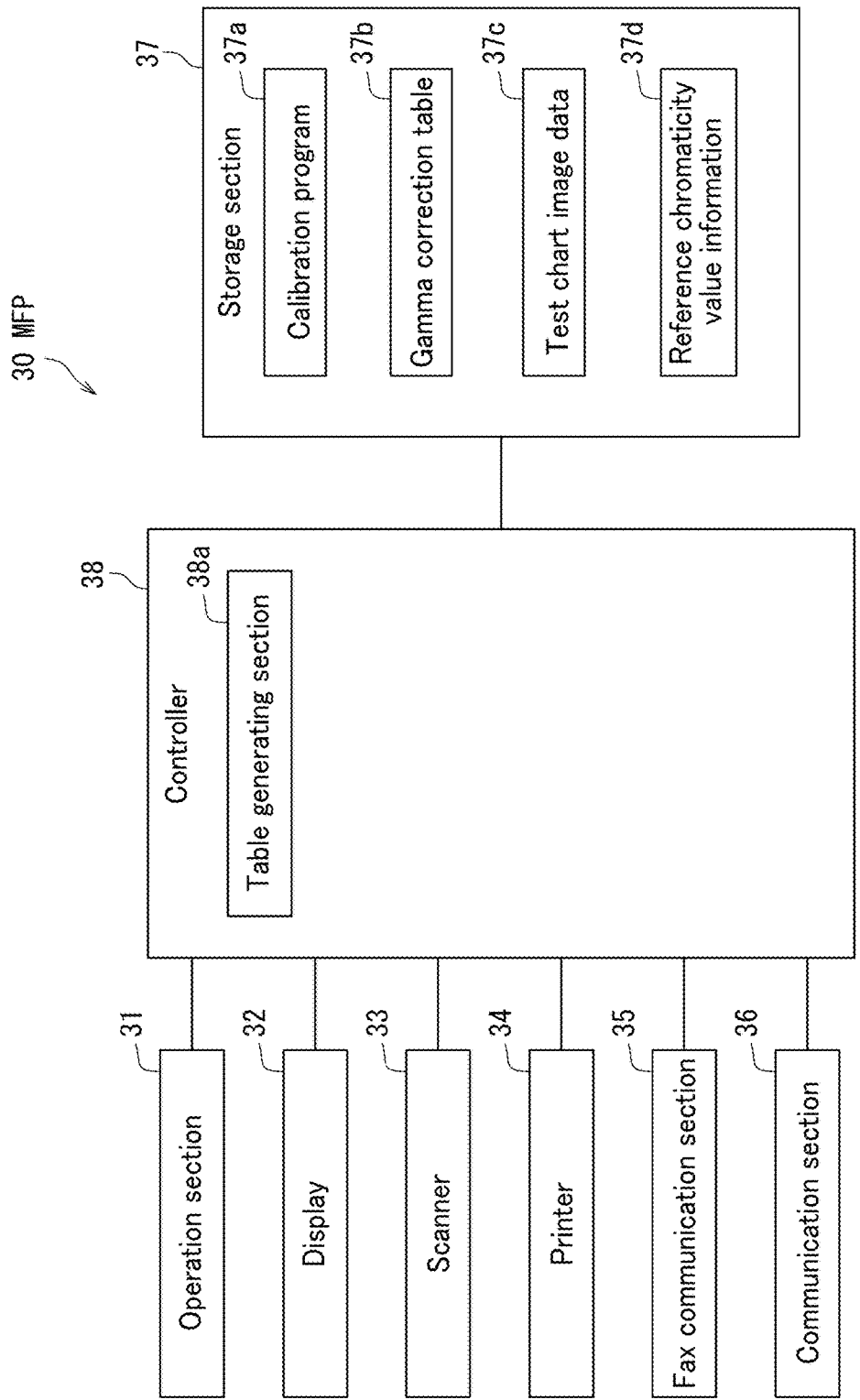
FIG. 3 is a block diagram of a multifunction peripheral (MFP) illustrated in FIG. 1.

FIG. 3 is a block diagram of the MFP 30.

As illustrated in FIG. 3, the MFP 30 includes an operation section 31, a display 32, a scanner 33, a printer 34, a fax communication section 35, a communication section 36, a storage section 37, and a controller 38. The operation section 31 is an input device such as buttons that receive input of various operations. The display 32 is a display device that displays various types of information, such as an LCD. The scanner 33 is a reading device that reads an image from an original document. The printer 34 is a printing device that performs printing on a recording medium such as paper. The fax communication section 35 is a facsimile device that performs fax communication with external facsimile devices, not illustrated, via a communication line such as a public telephone line. The communication section 36 is a communication device that performs communication with external devices via the network 11 (see FIG. 1) or a communication cable. The storage section 37 is a non-volatile storage device that stores therein various types of data, such as semiconductor memory or a hard disk drive (HDD). The controller 38 performs overall control of the MFP 30.

The storage section 37 stores therein a calibration program 37a for correcting gradation characteristics of the printer 34. The calibration program 37a may be installed on the MFP 30 during production of the MFP 30. Alternatively, the calibration program 37a may be additionally installed on the MFP 30 from a storage medium such as an SD card or a universal serial bus (USB) memory device. Alternatively, the calibration program 37a may be additionally installed on the MFP 30 via the network 11 (see FIG. 1).

The storage section 37 stores therein a gamma correction table (lookup table: LUT) 37b that is used for correcting gradation characteristics of the MFP 30.

Figure 4:
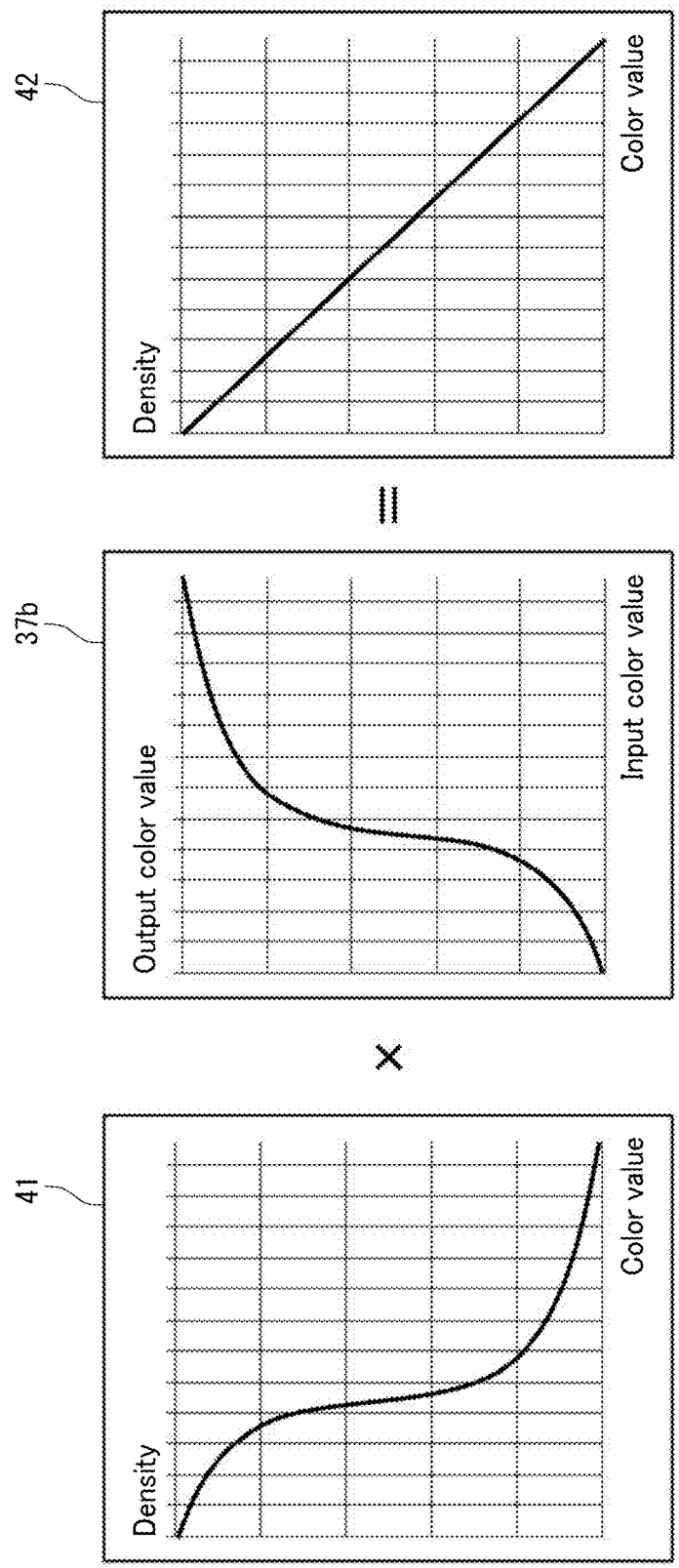
FIG. 4 is a diagram illustrating principles of a gamma correction table illustrated in FIG. 3.

FIG. 4 is a diagram illustrating principles of the gamma correction table 37b.

As illustrated in FIG. 4, actual gradation characteristics 41 of the printer 34 may deviate from predicted gradation characteristics 42. In such a situation, the controller 38 applies the gamma correction table 37b to the actual gradation characteristics 41 of the printer 34. As a result, the controller 38 can achieve the expected gradation characteristics 42.

As illustrated in FIG. 3, the storage section 37 further stores therein test chart image data 37c, which is image data of a test chart, and reference chromaticity value information 37d. The test chart contains patches of a plurality of colors. The reference chromaticity value information 37d indicates chromaticity values of the respective patches in the reference chart. Device-independent chromaticity values of the respective patches in the reference chart are known.

Hereinafter, description is provided using XYZ values as the device-independent chromaticity values.

Figure 5A:
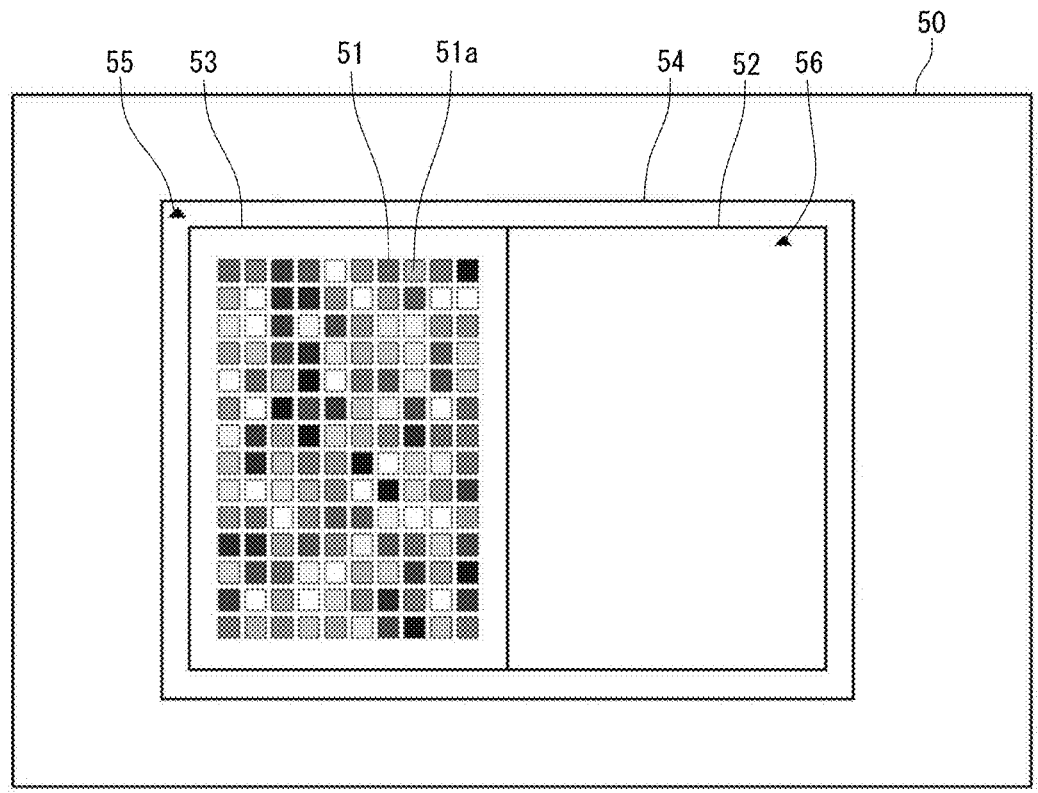
FIG. 5A is a diagram illustrating an example of a test sheet printed on based on test chart image data illustrated in FIG. 3.
Figure 5B:
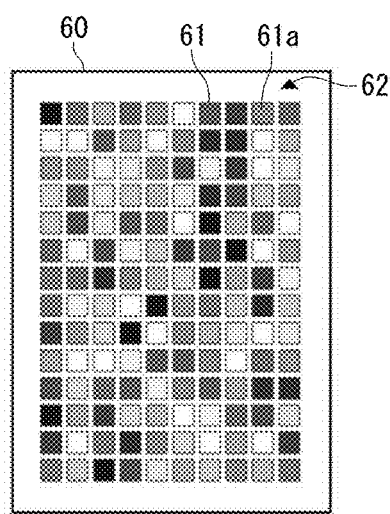
FIG. 5B is a diagram illustrating an example of a reference sheet that is used together with the test sheet illustrated in FIG. 5A.

FIG. 5A is a diagram illustrating an example of a test sheet 50, which is a sheet printed on based on the test chart image data 37c. FIG. 5B is a diagram illustrating an example of a reference sheet 60 that is used together with the test sheet 50.

As illustrated in FIG. 5A, the test sheet 50 includes a test chart 51, which is a chart, a border 52, a border 53, and a border 54 that are printed thereon by the printer 34. The test chart 51 contains patches 51a of a plurality of colors. The border 52 indicates a position in which the reference sheet 60 is to be placed. The border 53 surrounds the test chart 51. The border 54 surrounds the border 52 and the border 53. A triangle 55 indicating orientation of the test chart 51 and a triangle 56 indicating orientation of the reference sheet 60 to be placed are also printed on the test sheet 50.

As illustrated in FIG. 5B, the reference sheet 60 includes a reference chart 61 containing patches 61a of a plurality of colors and a triangle 62 indicating orientation of the reference chart 61. The reference chart 61 is equivalent to the test chart 51 that is mirror-reversed. The reference chart 61 corresponds to the test chart 51. The reference chart 61 is not a chart that is printed by the printer 34. Accordingly, the reference chart 61 is more accurate than the test chart 51 in terms of color values.

The controller 38 illustrated in FIG. 3 for example includes a CPU, ROM that stores a program and various types of data, and RAM that is used as a work area of the CPU of the controller 38. The CPU of the controller 38 executes a program stored in the ROM of the controller 38 or in the storage section 37.

The controller 38 functions as a table generating section 38a by executing the calibration program 37a stored in the storage section 37. The table generating section 38a generates the gamma correction table 37b. The controller 38 corrects the gradation characteristics of the MFP 30 to gradation characteristics in accordance with the reference chart 61 (see FIG. 5) by applying the gamma correction table 37b to the gradation characteristics of the MFP 30.

The following describes a calibration method that is adopted in the calibration system 10.

Figure 6:
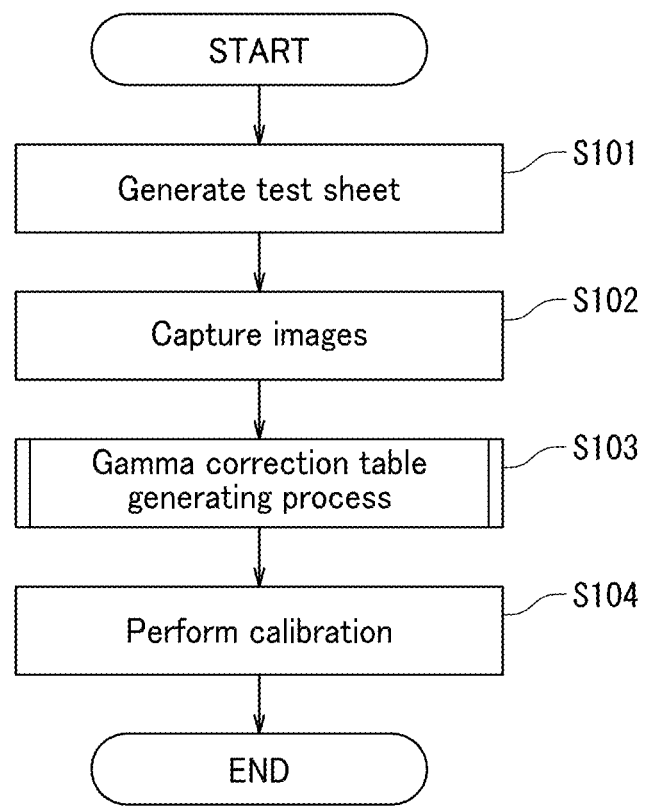
FIG. 6 is a flowchart of the calibration method that is adopted in the calibration system illustrated in FIG. 1.

FIG. 6 is a flowchart of the calibration method that is adopted in the calibration system 10.

A user directs the MFP 30 to generate the test sheet 50 using the operation section 31 and the like of the MFP. Accordingly, the controller 38 of the MFP 30 executes the calibration program 37a stored in the storage section 37 to cause the printer 34 to print the test chart 51. Thus, the printer 34 generates the test sheet 50 as illustrated in FIG. 6 (S101).

Figure 7:
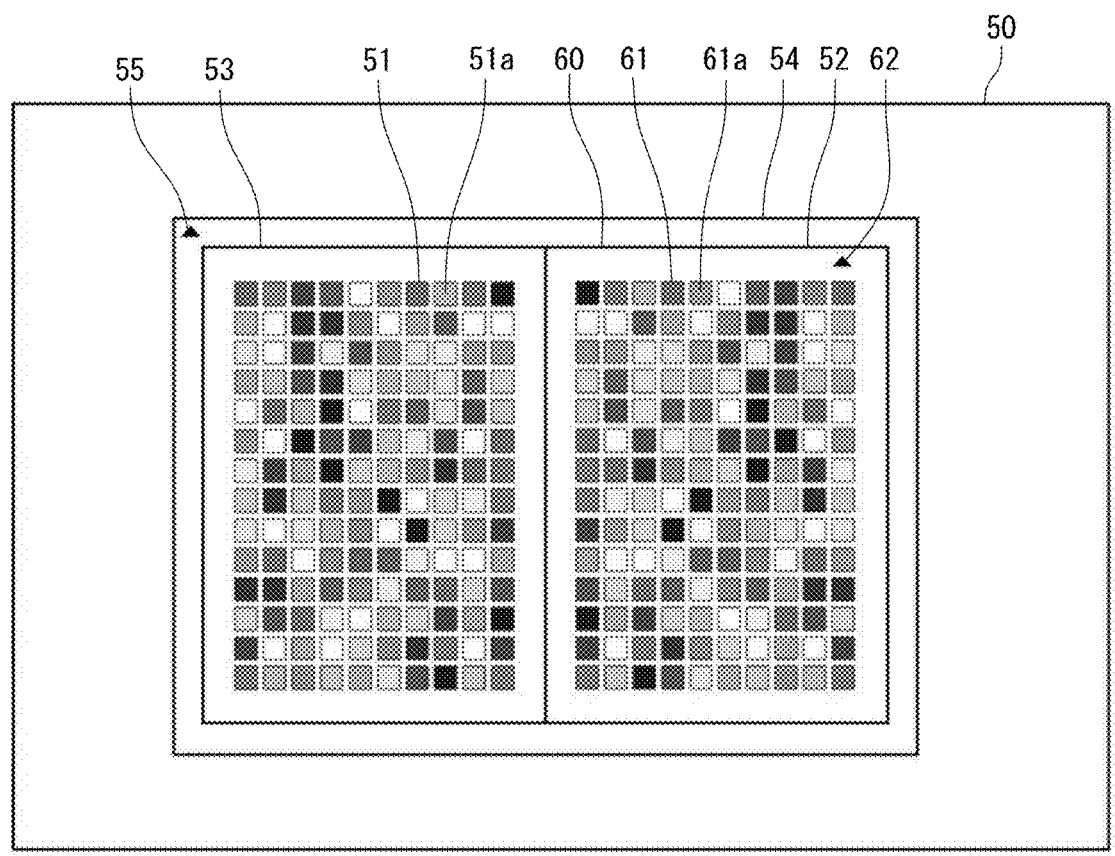
FIG. 7 is a diagram illustrating an example of the test sheet illustrated in FIG. 5A and the reference sheet illustrated in FIG. 5B placed within a border on the test sheet.

Subsequent to S101, as illustrated in FIG. 6, the user uses the camera 23 of the smartphone 20 to capture an image of the test sheet 50 with the reference sheet 60 placed within the border 52 on the test sheet 50 as illustrated in FIG. 7 (S102). That is, the smartphone 20 generates an image (hereinafter, referred to as "a picture") by capturing an image of the test chart 51 and an image of the reference chart 61 together. The smartphone 20 then transmits the thus obtained picture to the MFP 30.

Figure 8:
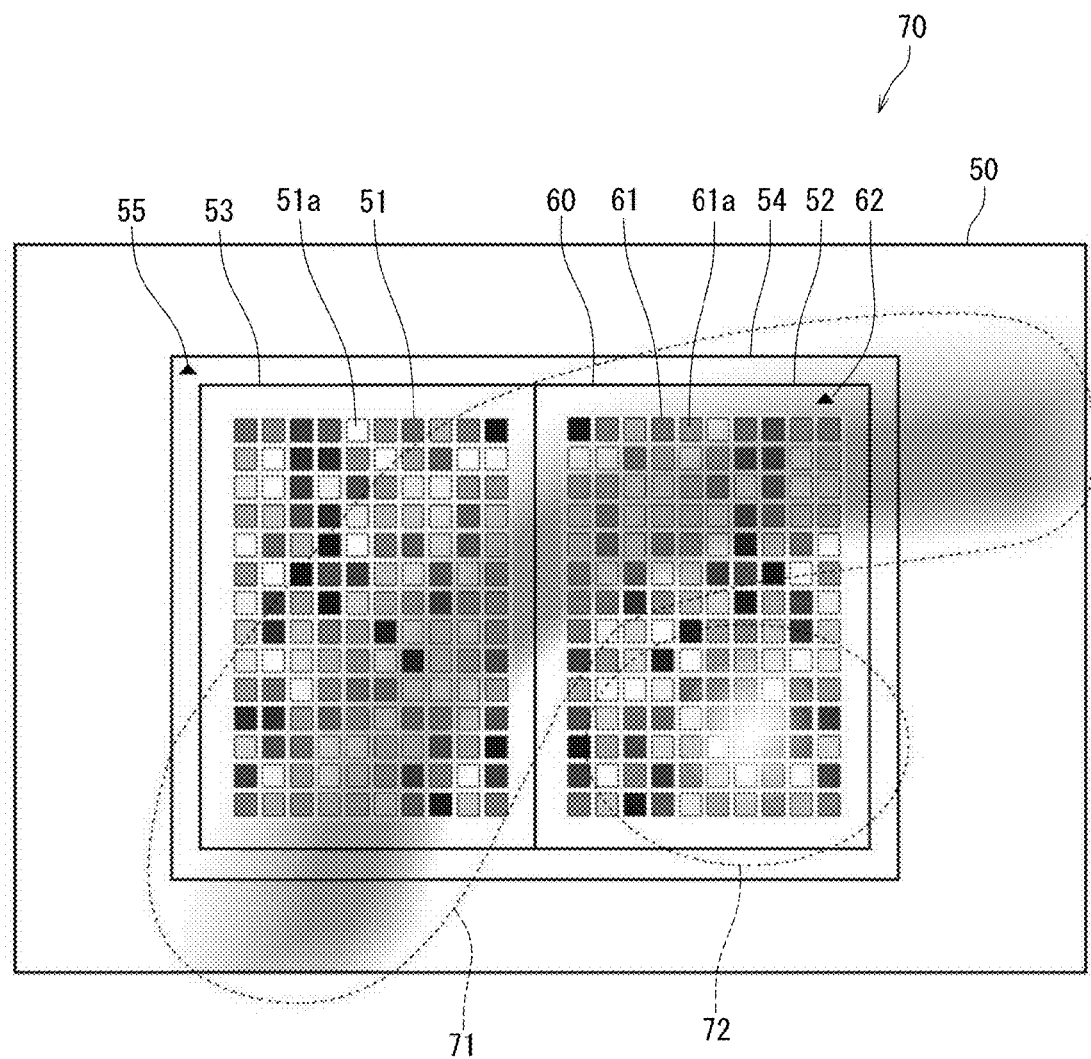
FIG. 8 is a diagram illustrating an example of a picture generated by the smartphone illustrated in FIG. 2.

FIG. 8 is a diagram illustrating an example of a picture 70 generated in S102.

As illustrated in FIG. 8, the picture 70 includes the test sheet 50 and the reference sheet 60. The test sheet 50 in the picture 70 has the reference sheet 60 placed within the border 52 on the test sheet 50.

The picture 70 illustrated in FIG. 8 includes spots resulting from different lightnesses. For example, the picture 70 has a region 71 having a lower lightness due to a shadow of an object of some sort such as the user appearing on the image and a region 72 having a higher lightness due to halation.

Figure 9:
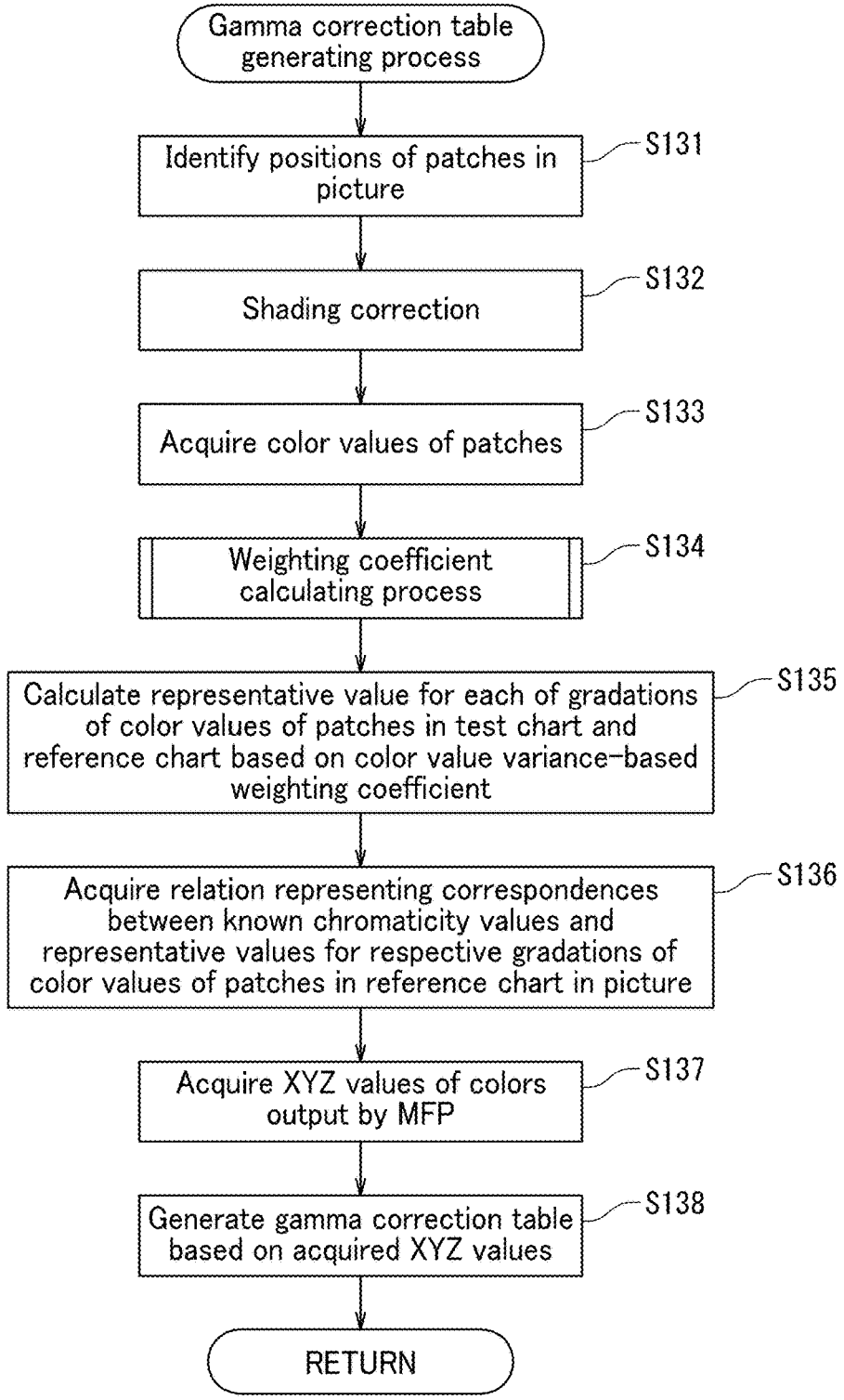
FIG. 9 is a flowchart of a gamma correction table generating process illustrated in FIG. 6.

Subsequent to S102, as illustrated in FIG. 6, the table generating section 38a of the MFP 30 performs a gamma correction table generating process illustrated in FIG. 9 based on the picture transmitted from the smartphone 20 (S103).

FIG. 9 is a flowchart of the gamma correction table generating process illustrated in FIG. 6.

As illustrated in FIG. 9, the table generating section 38a identifies positions of the respective patches 51a in the test chart 51 and the respective patches 61a in the reference chart 61 in the picture 70 by image processing (S131). Hereinafter, the patches 51a in the test chart 51 and the patches 61a in the reference chart 61 may be collectively referred to as patches.

Next, the table generating section 38a performs shading correction on the picture (S132).

Next, the table generating section 38a acquires color values of the patches whose positions are identified in S131 (S133).

It is noted here that the table generating section 38a trying to acquire color values of pixels of a region around a contour of each of the patches may falsely acquire color values of pixels outside the patch if the table generating section 38a targets a whole area of each of the patches in order to acquire color values of the patches in the picture 70. When acquiring color values of the patches in the picture 70, therefore, the table generating section 38a only acquires color values of pixels of a specific region around a center of each patch (hereinafter, referred to as "a central region") rather than a region around the contour of the patch.

Figure 10:
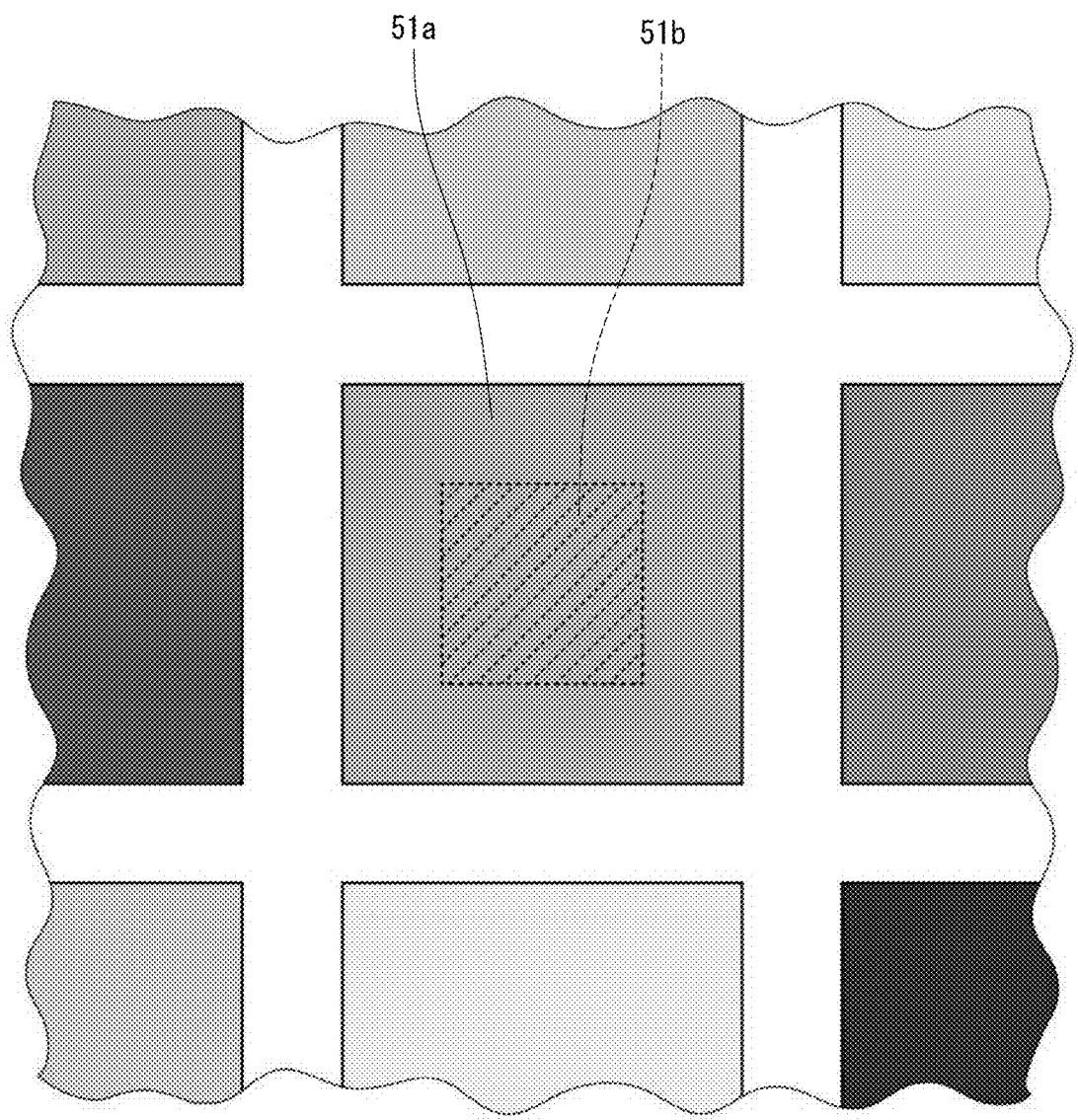
FIG. 10 is a diagram illustrating an example of a central region of a patch in the test chart illustrated in FIG. 5A.

More specifically, when acquiring color values of the patches 51A in the picture 70 as illustrated in FIG. 10, the table generating section 38a only acquires color values of pixels of a central region 51b of each patch 51a. The table generating section 38a then determines an average value of the thus acquired color values of the pixels as a color value of the patch 51a. The central region 51b is for example a region defined by sides each having a length half a length of each side of a whole area of the patch 51a. Although description has been given using the patches 51a, the same applies to the patches 61a.

Hereinafter, description is provided using RGB values as color values in the picture 70.

Subsequent to S133, the table generating section 38a performs a weighting coefficient calculating process of calculating a weighting coefficient (S134). The weighting coefficient is a constant factor that is used for calculating a representative value for each of gradations of the color values of the patches 51a in the test chart 51 in the picture 70 and a representative value for each of gradations of the color values of the patches 61a in the reference chart 61 in the picture 70.

Figure 11:
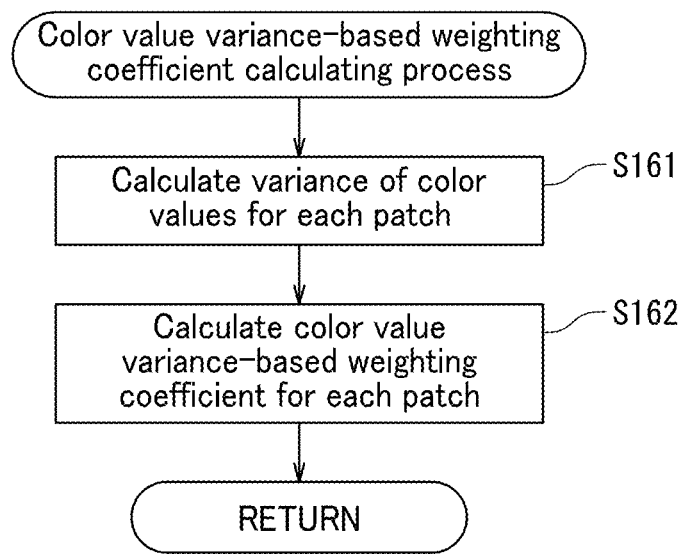
FIG. 11 is a flowchart of a weighting coefficient calculating process illustrated in FIG. 9.

FIG. 11 is a flowchart of a color value variance-based weighting coefficient calculating process illustrated in FIG. 9.

As illustrated in FIG. 11, the table generating section 38a calculates a variance of color values of pixels in each of the patches in the picture 70 in accordance with equation 1 (S161). In the equation 1, S' represents a variance of RGB values of a target patch. $rgb_n$ represents an RGB value of each of the pixels in the central region of the target patch. A subscript n attached to $rgb_n$ is an integer for identifying a pixel, among the pixels in the central region of the target patch, associated with the value represented by $rgb_n$. There are for example one to N different integers as the integer. N represents the number of pixels present in the central region of the target patch. $rgb_{ave}$ represents an average value of RGB values of the pixels present in the central region of the target patch.

$$S' = \frac{\sum_{n=1}^{N}(rgb_n - rgb_{ave})^2}{N-1}$$

Next, the table generating section 38a calculates a color value variance-based weighting coefficient for each patch using the variance calculated in S161 in accordance with equation 2 (S162). The color value variance-based weighting coefficient is a weighting coefficient based on the variance of color values of the pixels in each of the patches in the picture 70. That is, the color value variance-based weighting coefficient is a weighting coefficient based on a color intensity of each of the patches in the picture 70. In the equation 2, ScatterWeight represents a color value variance-based weighting coefficient of a target patch. S' represents a variance of RGB values of the target patch. $S_{ave}$ represents an average value of variances S' of the RGB values of all the patches in the picture. abs( ) is a function for determining an absolute value of a numerical value in the ( ).

$$ScatterWeight = \frac{1}{abs(S' - S_{ave})} \quad \text{Equation 2}$$

Note that ScatterWeight in the equation 2 can be extremely large when abs(S'−$S_{ave}$) is near 0. ScatterWeight may therefore be provided with an upper limit.

Subsequent to completion of S162, the table generating section 38a ends the weighting coefficient calculating process illustrated in FIG. 11.

Subsequent to the weighting coefficient calculating process in S134, as illustrated in FIG. 9, the table generating section 38a calculates a representative value for each of the gradations of the color values of the patches in the test chart 51 and the reference chart 61 based on the color value variance-based weighting coefficient calculated in the weighting coefficient calculating process illustrated in S134 (S135).

More specifically, the table generating section 38a calculates, as a representative value for each of the gradations of the color values of the patches in the test chart 51 and the reference chart 61, a weighted average $RGB_s$ of color values of a plurality of patches in the gradation in accordance with equation 3 based on the color value variance-based weighting coefficient. That is, the table generating section 38a calculates, as the representative value, the weighted average $RGB_s$ for each of the gradations of the color values of the patches 51a in the test chart 51 and calculates, as the representative value, the weighted average $RGB_s$ for each of the gradations of the color values of the patches 61a in the reference chart 61. In the equation 3, $ScatterWeight_m$ represents a color value variance-based weighting coefficient of each patch that is calculated in S162 illustrated in FIG. 11. $RGB_m$ represents a color value of each patch that is acquired in S133. A subscript m attached to $ScatterWeight_m$ and $RGB_m$ is an integer for identifying a patch, among the patches in a single gradation in the test chart 51 and the reference chart 61, associated with the values respectively represented by $ScatterWeight_m$ and $RGB_m$. There are for example one to M different integers as the integer. M represents the number of patches in the single gradation in the test chart 51 and the reference chart 61. For example, in a case where the table generating section 38a calculates the weighted average $RGB_s$ of color values of the patches 51a in a specific gradation in the test chart 51, and the number of patches 51a in the specific gradation in the test chart 51 is 4, M is 4.

$$RGB_s = \frac{\sum (ScatterWeight_m \times RGB_m)}{\sum ScatterWeight_m} \quad \text{Equation 3}$$

Figure 12:
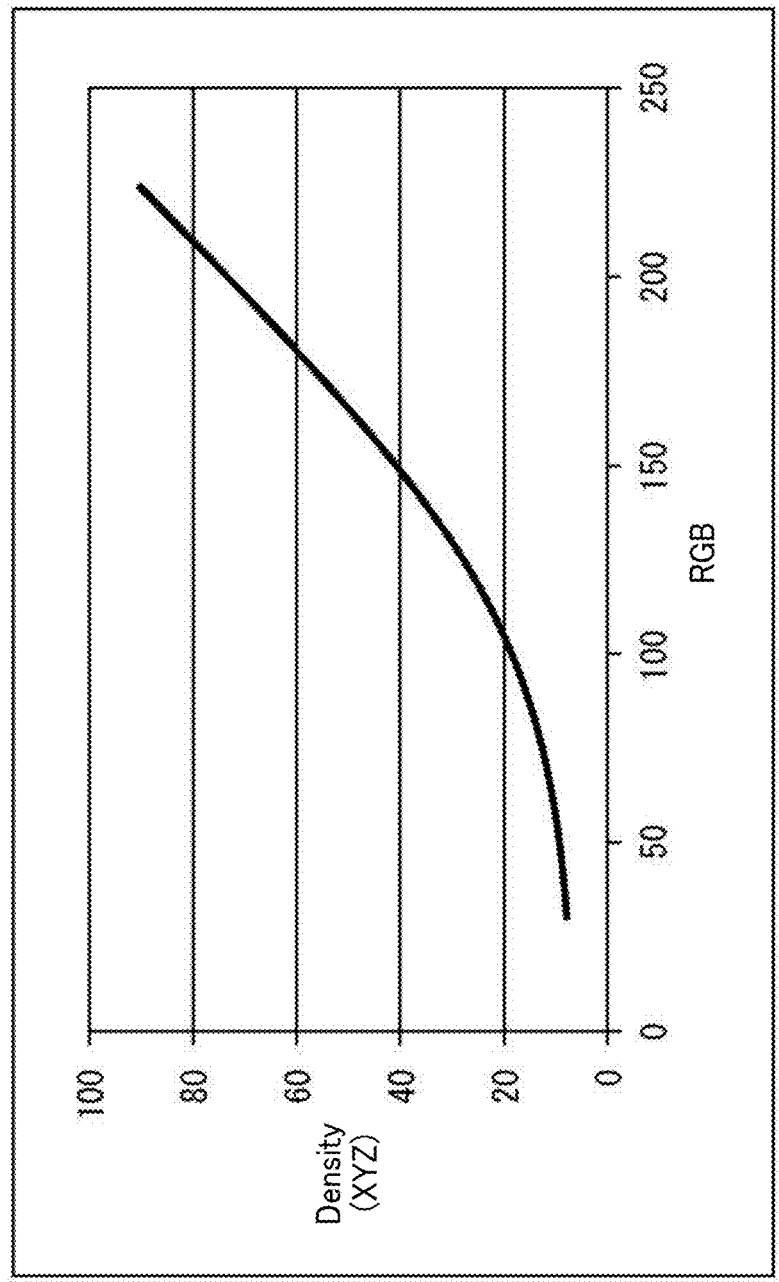
FIG. 12 is a diagram illustrating an example of a relation generated in the gamma correction table generating process illustrated in FIG. 9.

Subsequent to S135, the table generating section 38a acquires a relation, such as shown in FIG. 12, representing correspondences between known XYZ values and the representative values calculated in S135 for the respective gradations of the RGB values of the patches 61a in the reference chart 61 (S136). It is noted here that the table generating section 38a can acquire the known XYZ values for the respective patches 61a in the reference chart 61 based on the reference chromaticity value information 37d. The table generating section 38a can therefore recognize which of the representative values for the respective gradations of the RGB values in the picture corresponds to which of the XYZ values based on the positions of the patches 61a in the reference chart 61.

Figure 13:
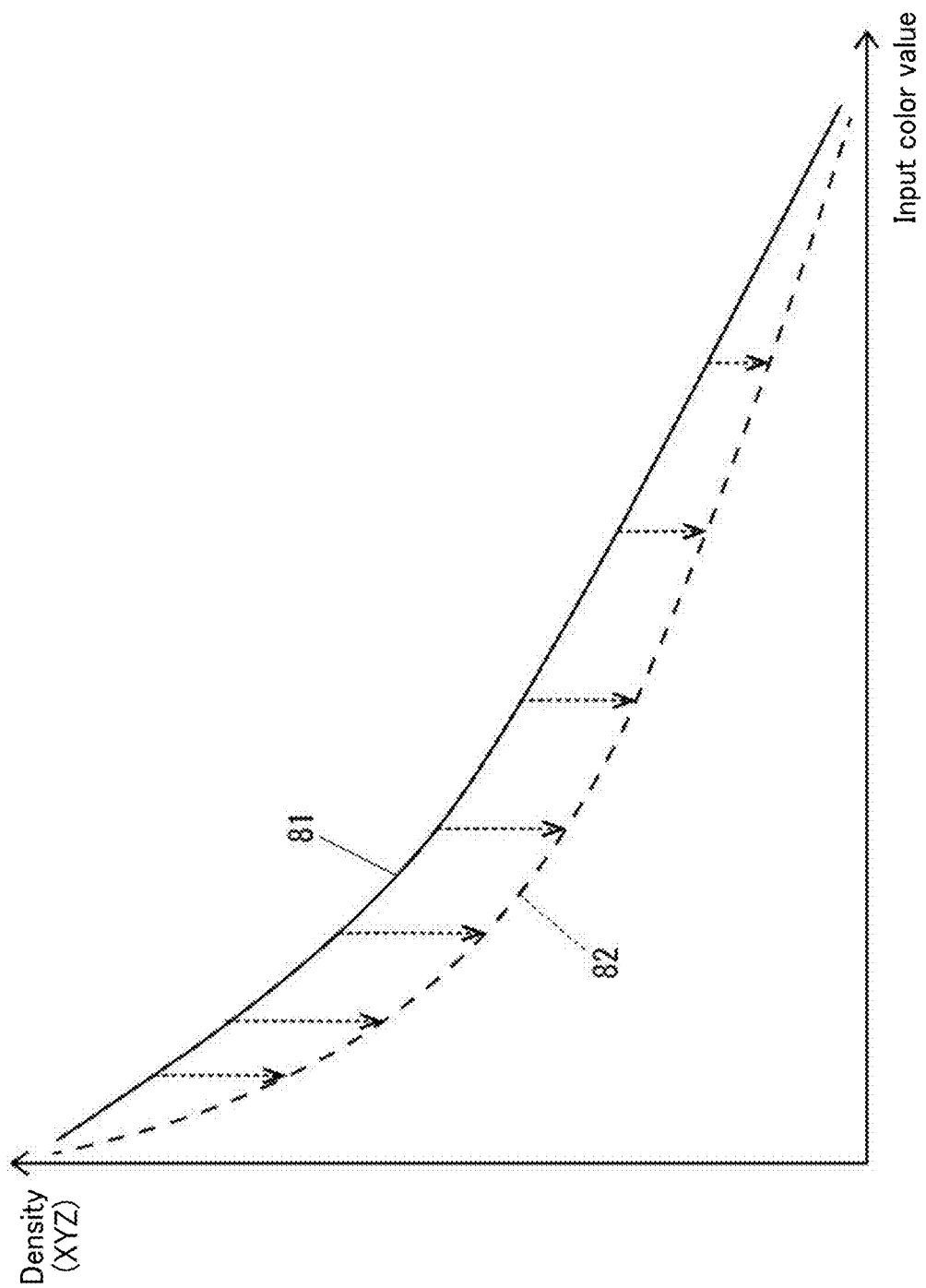
FIG. 13 is a diagram illustrating an example of graduation characteristics of the MFP illustrated in FIG. 3.

Subsequent to S136, the table generating section 38a acquires XYZ values of colors that are output by the MFP 30 for the patches 51a in the test chart 51 (S137). More specifically, the table generating section 38a acquires the XYZ values by assigning each of the representative values calculated in S135 for the respective gradations of the RGB values of the patches 51a in the test chart 51 to the relation acquired in S136. Thus, the table generating section 38a can acquire gradation characteristics 81 of the MFP 30 such as illustrated in FIG. 13. The gradation characteristics 81 show a relationship between color values in the test chart image data 37c for the patches 51a in the test chart 51, that is, input color values and the XYZ values acquires in S137 for the gradations of the patches 51a. The table generating section 38a can also acquire a relationship 82 between the color values in the test chart image data 37c for the patches 51a in the test chart 51, that is, the input color values and the XYZ values specified in the reference chromaticity value information 37d for the patches 61a in the reference chart 61 corresponding to the patches 51a as illustrated in FIG. 13.

Subsequent to S137, the table generating section 38a generates a gamma correction table that is used for correcting the gradation characteristics 81 of the MFP 30 to the relationship 82 in the reference chart 61 as indicated by arrows in FIG. 13 (S138). That is, the table generating section 38a generates the gamma correction table that is used for correcting the gradation characteristics 81 of the MFP 30 to gradation characteristics in accordance with the reference chart 61 based on differences between the XYZ values of colors that are output by the MFP 30 for the patches 51a in the test chart 51 and the known XYZ values of the patches 61a in the reference chart 61.

Subsequent to completion of S138, the table generating section 38a ends the gamma correction table generating process illustrated in FIG. 9.

Subsequent to the gamma correction table generating process in S103, as illustrated in FIG. 6, the controller 38 performs calibration (S104). More specifically, the controller 38 updates the gamma correction table 37b in the storage section 37 to the gamma correction table generated in the gamma correction table generating process in S103 by executing the calibration program 37a.

As described above, even if the picture 70 includes a spot resulting from different lightnesses, the calibration system 10 can calculate a representative value for each of the gradations of the color values of the patches in the test chart 51 and the reference chart 61 with a high degree of accuracy by performing weighing for each of the patches in the picture 70 based on the variance of the color values of the pixels in the patch (S135). Thus, the influence of the spot resulting from different lightnesses in the picture on the result of correction of gradation characteristics can be reduced. Consequently, the calibration system 10 can improve the accuracy of correction of gradation characteristics.

In the calibration system 10, halation may occur depending on environmental conditions, such as an illumination condition, for capturing images of the test chart 51 and the reference chart 61. In a case where halation or the like occurs in the calibration system 10, and the lightness of a portion including some patches increases to be higher than an originally intended lightness due to the halation or the like, the likelihood of the portion having a higher lightness than the originally intended lightness being influenced by noise introduced in the picture during the image capture by the smartphone 20 increases with increase in the lightness. That is, the variance (dispersion) in each of the patches having a higher lightness than the originally intended lightness increases. The calibration system 10 calculates a representative value for each of the gradations of the color values of the patches while reducing the influence of the color values of the patches in which the variance of color values of the pixels is too high, that is, the patches having a higher lightness than the originally intended lightness. Thus, the calibration system 10 can improve the accuracy of the representative value for each of the gradations of the color values of the patches.

In the calibration system 10, for example a shadow of an object of some sort such as a user may appear on the picture generated by the smartphone 20 depending on environmental conditions for capturing images of the test chart 51 and the reference chart 61. In a case where a shadow of an object of some sort appears on the picture generated by the smartphone 20 in the calibration system 10, and the lightness of a portion including some patches decreases to be lower than an originally intended lightness due to the shadow, the likelihood of the portion having a lower lightness than the originally intended lightness being influenced by noise introduced in the picture during the image capture by the smartphone 20 decreases with decrease in the lightness. That is, the variance (dispersion) in each of the patches having a lower lightness than the originally intended lightness decreases. The calibration system 10 calculates a representative value for each of the gradations of the color values of the patches while reducing the influence of the color values of the patches in which the variance of color values of the pixels is too low, that is, the patches having a lower lightness than the originally intended lightness. Thus, the calibration system 10 can improve the accuracy of the representative value for each of the gradations of the color values of the patches.

The calibration system 10 calculates the representative values (S135) after performing shading correction (S132) and thus reducing the significance of a spot resulting from different lightnesses in a picture depending on properties of the smartphone 20. The calibration system 10 can therefore further reduce the influence of the spot resulting from different lightnesses in the picture on the result of correction of gradation characteristics. Consequently, the calibration system 10 can further improve the accuracy of correction of gradation characteristics.

Since the MFP 30 in the calibration system 10 includes the table generating section 38a, the imaging device does not need to include a table generating section. Accordingly, the imaging device that is used in the calibration system 10 does not need to be a highly capable device such as the smartphone 20. Consequently, an ordinary imaging device can be used in the calibration system 10, improving usability.

Figure 14:
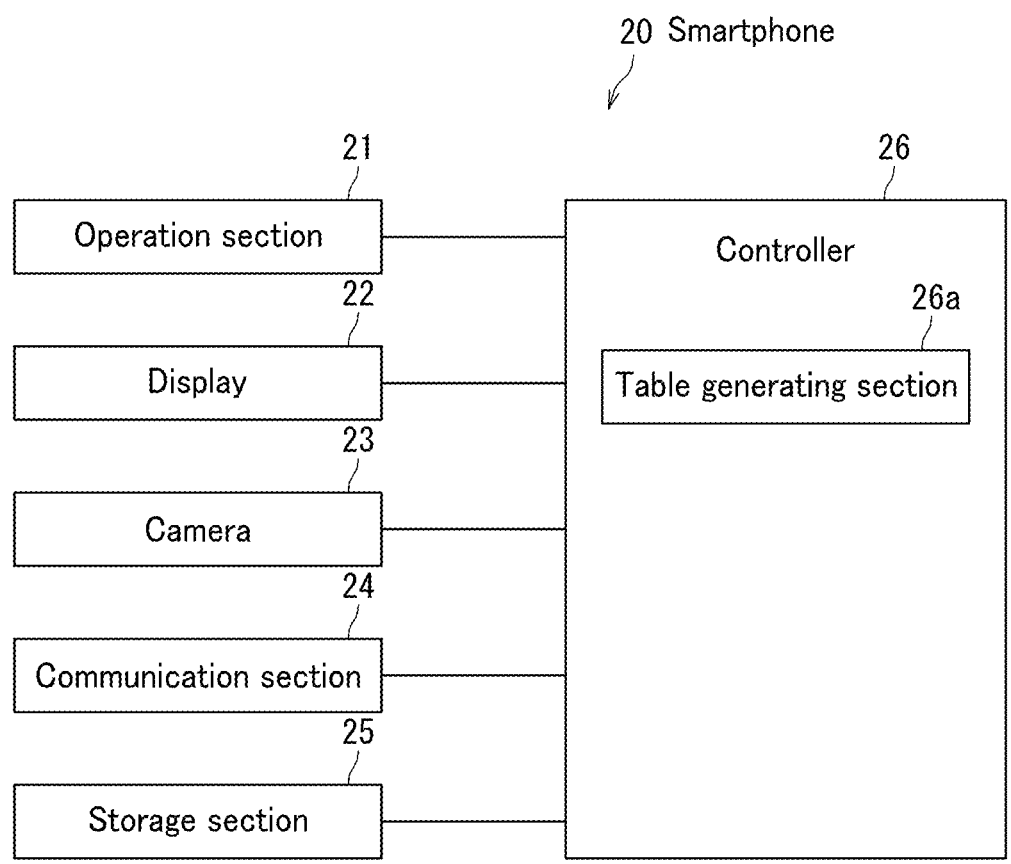
FIG. 14 is a block diagram illustrating another example of the smartphone illustrated in FIG. 1, which is different from the example illustrated in FIG. 2.

In the description of the calibration system 10 above, S103 is performed by the MFP 30. Alternatively, at least a part of S103 may be performed by the smartphone 20. For example, in a case where S103 is entirely performed by the smartphone 20, the controller 26 of the smartphone 20 functions as a table generating section 26a that generates a gamma correction table for correcting gradation characteristics of the MFP 30 as illustrated in FIG. 14. In such a case, the controller 26 of the smartphone 20 transmits the gamma correction table generated by the table generating section 26a to the MFP 30. The MFP 30 does not need to include a table generating section as long as S103 is entirely performed by the smartphone 20. Consequently, the processing burden on the MFP 30 for updating the gamma correction table 37b can be reduced.

Second Embodiment

A configuration of a calibration system according to a second embodiment of the present disclosure is the same as the configuration of the calibration system according to the first embodiment. Accordingly, detailed description thereof is omitted.

Operation of the calibration system according to the second embodiment is the same as the operation of the calibration system according to the first embodiment except steps described below.

Figure 15:
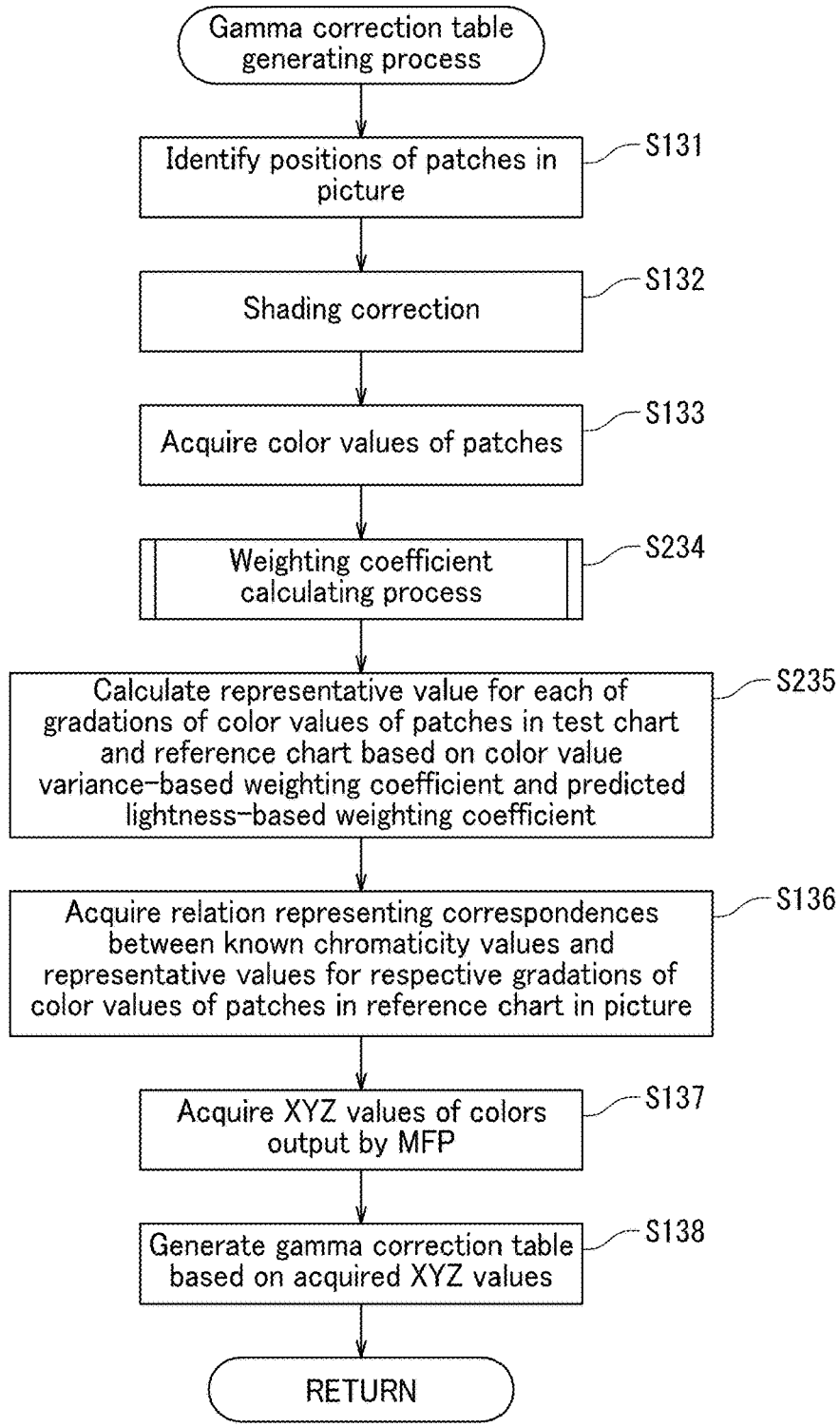
FIG. 15 is a flowchart of a gamma correction table generating process that is performed by a calibration system according to a second embodiment of the present disclosure.

The calibration system according to the second embodiment performs a process illustrated in FIG. 15 instead of the process illustrated in FIG. 9.

FIG. 15 is a flowchart of the gamma correction table generating process that is performed by the calibration system according to the second embodiment.

As illustrated in FIG. 15, the table generating section 38a performs S131 to S133 as in the gamma correction table generating process illustrated in FIG. 9.

Subsequent to S133, the table generating section 38a performs a weighting coefficient calculating process of calculating a weighting coefficient (S234). The weighting coefficient is a constant factor that is used for calculating a representative value for each of the gradations of the color values of the patches in the test chart 51 and the reference chart 61 in the picture.

Figure 16:
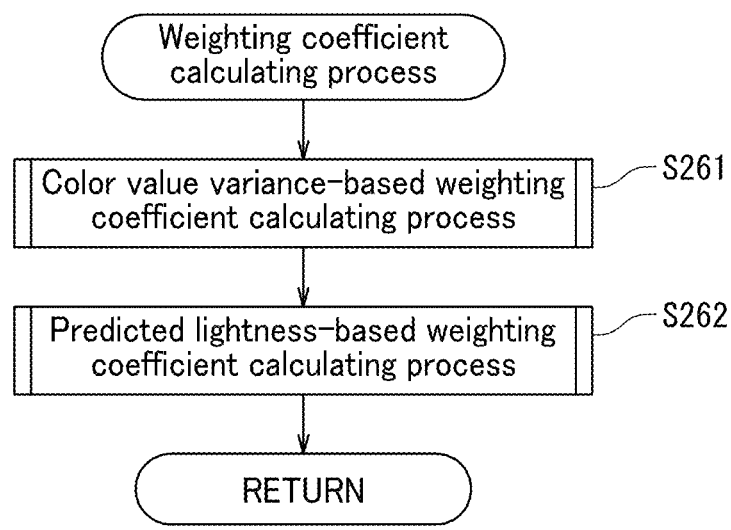
FIG. 16 is a flowchart of a weighting coefficient calculating process illustrated in FIG. 15.

FIG. 16 is a flowchart of the weighting coefficient calculating process illustrated in FIG. 15.

As illustrated in FIG. 16, the table generating section 38a performs a color value variance-based weighting coefficient calculating process of calculating a color value variance-based weighting coefficient (S261). The color value variance-based weighting coefficient is a weighting coefficient based on the variance of color values of the pixels in each of the patches in the picture 70. The color value variance-based weighting coefficient calculating process is performed in the same manner as in the weighting coefficient calculating process illustrated in FIG. 11.

Subsequent to the color value variance-based weighting coefficient calculating process in S261, the table generating section 38a performs a predicted lightness-based weighting coefficient calculating process of calculating a predicted lightness-based weighting coefficient (S262). The predicted lightness-based weighting coefficient is a weighting coefficient based on a predicted lightness of each of the patches in the picture 70 assuming the patch is a blank portion of the picture 70. That is, the predicted lightness-based weighting coefficient is a weighting coefficient based on a color intensity of each of the patches in the picture 70.

Figure 17:
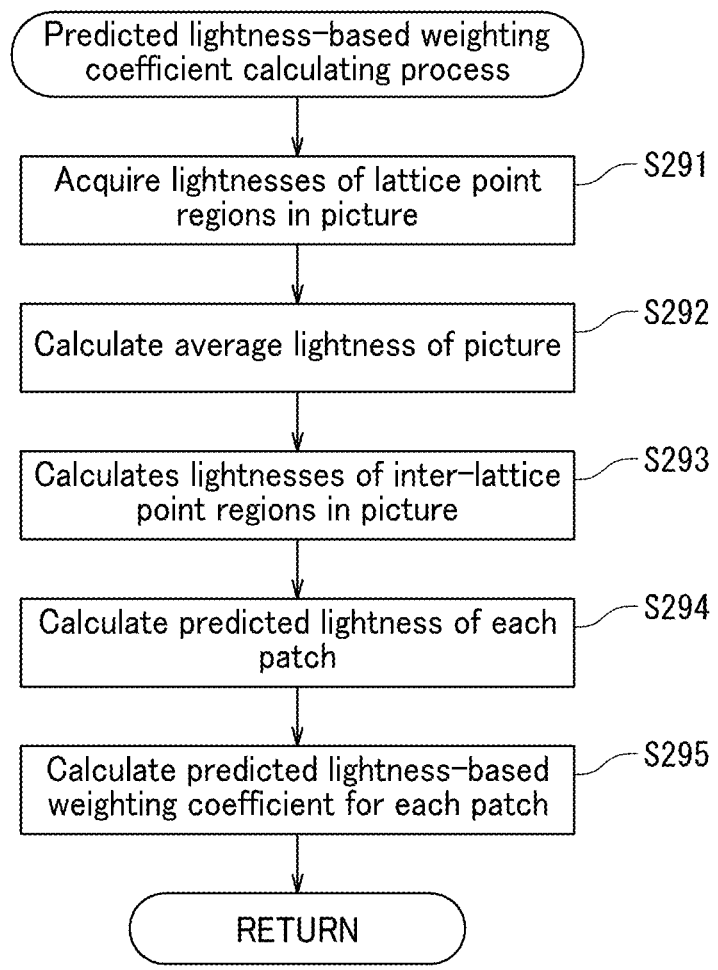
FIG. 17 is a flowchart of a predicted lightness-based weighting coefficient calculating process illustrated in FIG. 16.

FIG. 17 is a flowchart of the predicted lightness-based weighting coefficient calculating process illustrated in FIG. 16.

Figure 18:
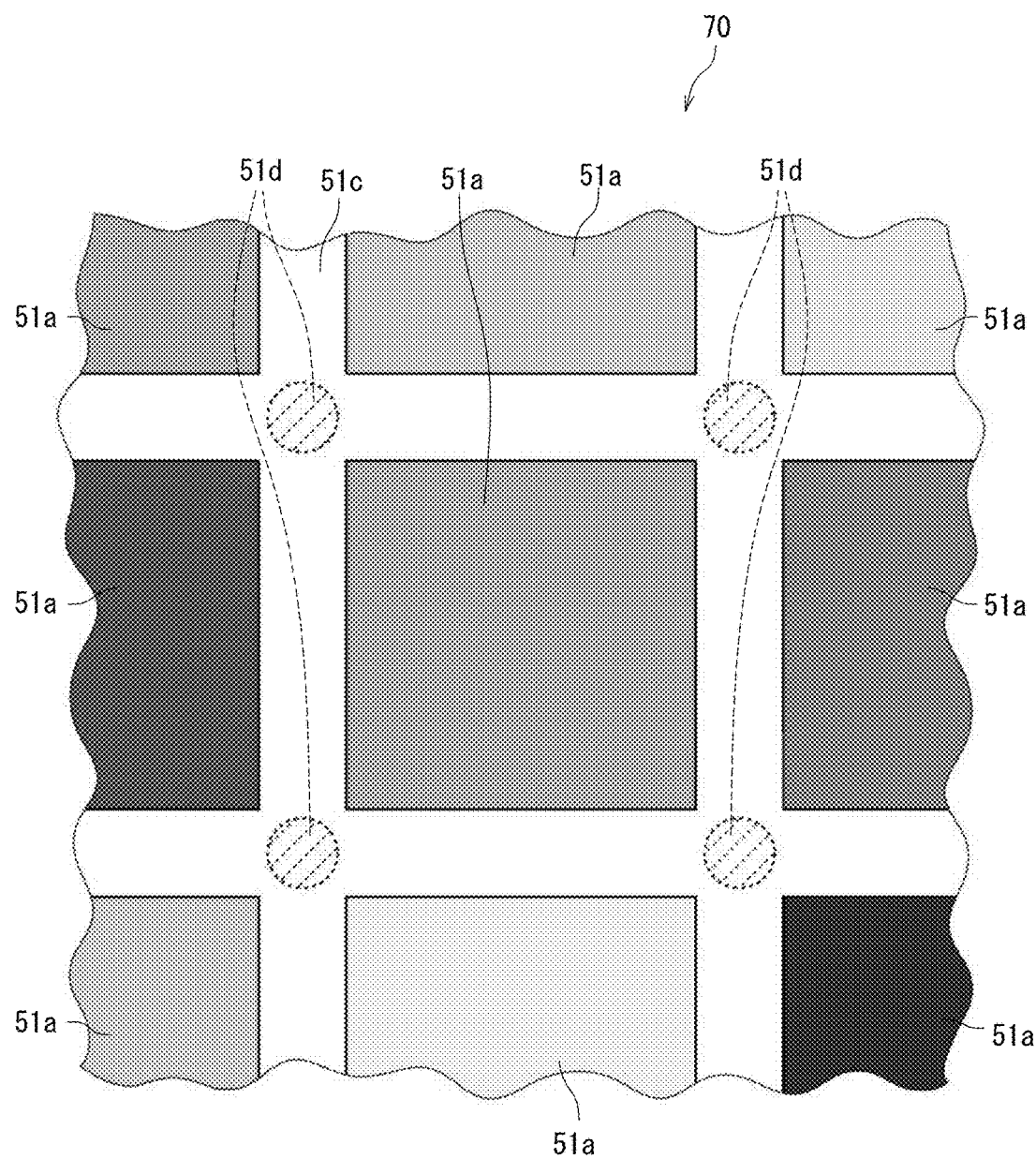
FIG. 18 is a diagram illustrating an example of lattice point regions of the test chart illustrated in FIG. 5A.

As illustrated in FIG. 17, the table generating section 38a acquires lightnesses of regions corresponding to lattice points (hereinafter, referred to as "lattice point regions") of a lattice, that is, a blank portion, formed by space between the patches in the picture (S291). For example, the table generating section 38a acquires lightnesses of lattice point regions 51d of a lattice 51c formed by the space between the patches 51a in the picture 70 as illustrated in FIG. 18. Although description has been given using the patches 51a, the same applies to the patches 61a. The test sheet 50 is generated by printing the test chart 51 on a white recording medium. Accordingly, the lattice 51c in the test chart 51 in the test sheet 50 is white. Likewise, a lattice in the reference chart 61 in the reference sheet 60 is white.

Subsequent to S291, the table generating section 38a calculates an average value of the lightnesses for the picture, that is, an average lightness based on the lightnesses of the lattice point regions 51d acquired in S291 (S292). That is, the table generating section 38a averages the lightnesses of the plurality of lattice point regions 51d acquired in S291 to determine the average lightness of the picture.

Figure 19:
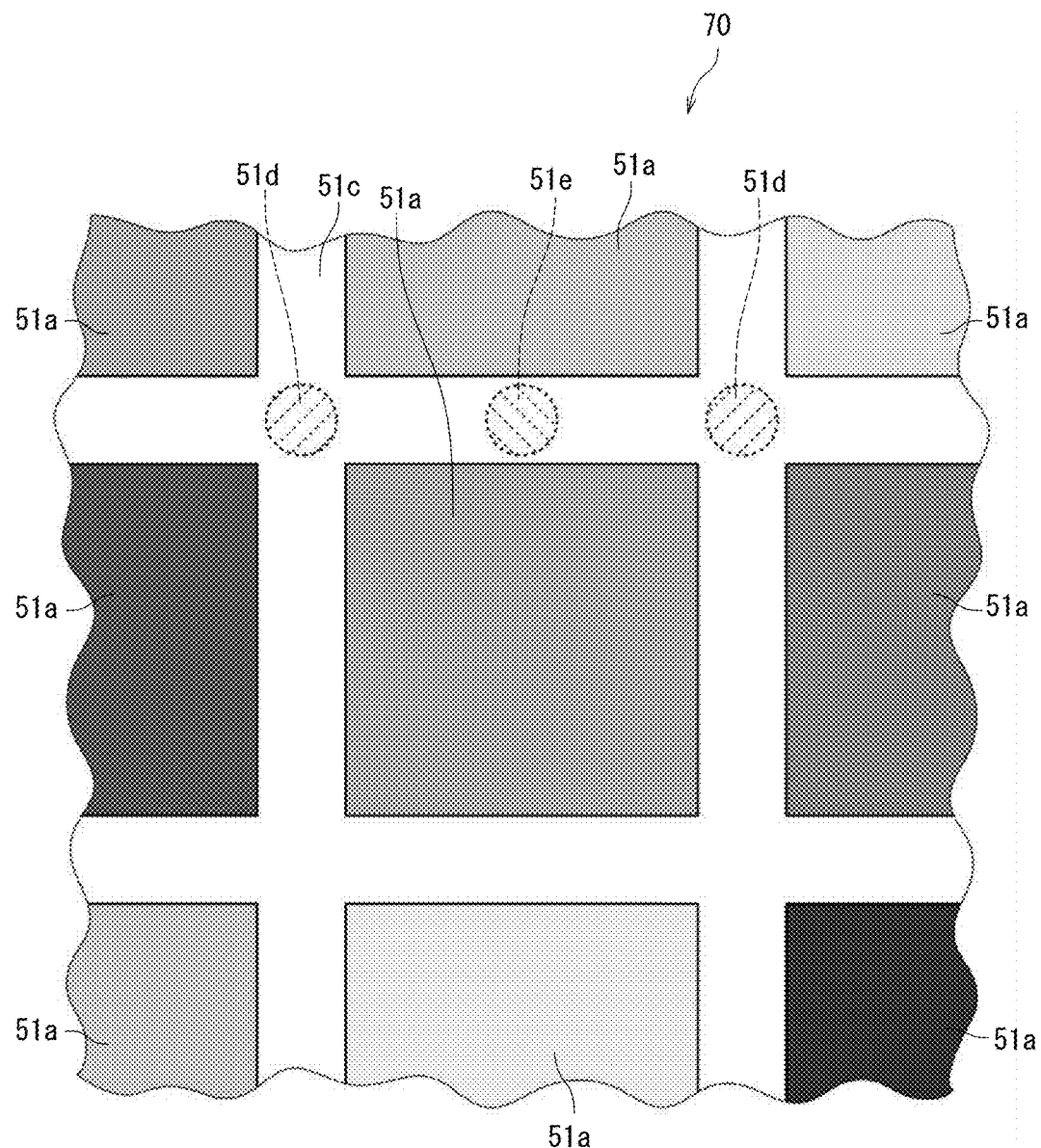
FIG. 19 is a diagram illustrating an example of an inter-lattice point region of the test chart illustrated in FIG. 5A.

Subsequent to S292, the table generating section 38a calculates lightnesses of regions each located in between adjacent lattice point regions (hereinafter, referred to as "inter-lattice point regions") for each of the patches 51a in the picture by linear interpolation based on the lightnesses of the lattice point regions acquired in S291 (S293). In a case where the lightnesses of the two adjacent lattice point regions 51d of the lattice 51c formed by the space between the patches 51a in the picture as illustrated in FIG. 19 are respectively 80 and 100, for example, the table generating section 38a calculates a lightness of an inter-lattice point region 51e located in between these lattice point regions 51d as 90, which is an average of the lightnesses of these lattice point regions 51d. Although description has been given using the patches 51a, the same applies to the patches 61a.

Figure 20:
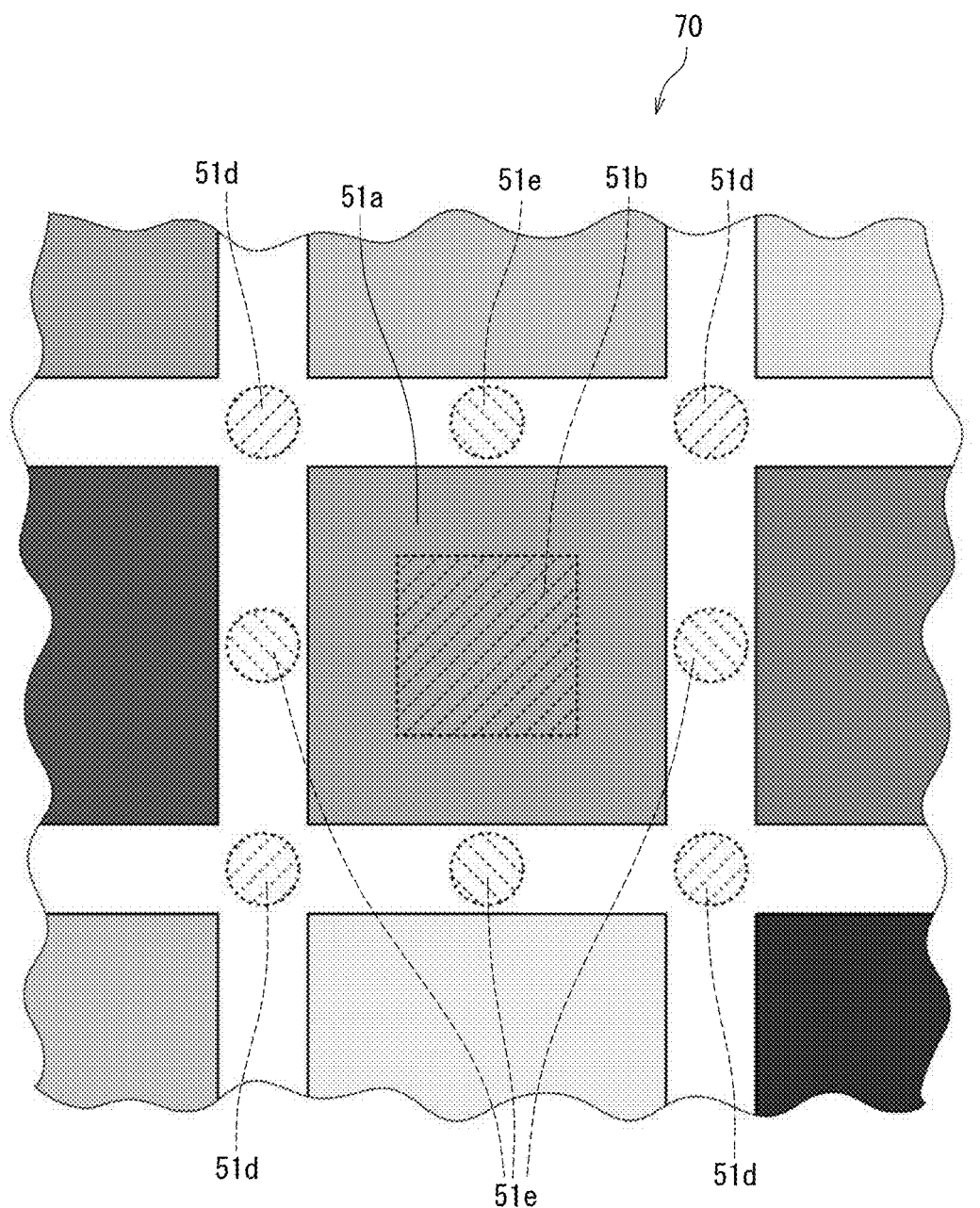
FIG. 20 is a diagram illustrating an example of a central region, lattice point regions, and inter-lattice point regions of a patch in the test chart illustrated in FIG. 5A.

Subsequent to S293, the table generating section 38a calculates a predicted lightness of each of the patches in the picture assuming the patch is a blank portion, that is, a white portion of the picture based on the lightnesses of the lattice point regions acquired in S291 and the lightnesses of the inter-lattice point regions calculated in S293 (S294). That is, as illustrated in FIG. 20, the table generating section 38a predicts the lightness of each patch 51a surrounded by the four lattice point regions 51d closest to the patch 51a and the four inter-lattice point regions 51e closest to the patch 51a in the picture assuming the patch 51a is a blank portion, that is a white portion of the picture.

More specifically, the table generating section 38a first calculates a reciprocal $W_{n,k}$ of a distance between each of the pixels in the central region 51b of the patch 51a and any of the four lattice point regions 51d closest to the patch 51a and the four inter-lattice point regions 51e closest to the patch 51a in accordance with equation 4. In the equation 4, $X_k$ and $Y_k$ represent an X-coordinate and a Y-coordinate, respectively, of any of the four lattice point regions 51d and the four inter-lattice point regions 51e. $x_n$ and $y_n$ represent an X-coordinate and a Y-coordinate, respectively, of a target pixel. A subscript k attached to $W_{n,k}$, $X_k$, and $Y_k$ is an integer for identifying a region, among the four lattice point regions 51d and the four inter-lattice point regions 51e, associated with the values respectively represented by $W_{n,k}$, $X_k$, and $Y_k$. There are for example one to 8 different integers as the integer. A subscript n attached to $W_{n,k}$, $x_n$, and $y_n$ is an integer for identifying a pixel, among the pixels in the central region 51b of the patch 51a, associated with the values respectively represented by $W_{n,k}$, $x_n$, and $y_n$. There are for example one to N different integers as the integer. N represents the number of pixels present in the central region 51b.

$$W_{n,k} = \frac{1}{\sqrt{(X_k - x_n)^2 + (Y_k - y_n)^2}} \quad \text{Equation 4}$$

Next, the table generating section 38a calculates a predicted lightness $l_n$ of each of the pixels in the central region 51b of the patch 51a in accordance with equation 5 assuming the pixel is a blank portion. In the equation 5, $W_{n,k}$ represents a result of calculating the equation 4. $L_k$ represents a lightness of any of the four lattice point regions 51d and the four inter-lattice point regions 51e. That is, $L_k$ represents either a lightness acquired in S291 or a lightness acquired in S293. A subscript k attached to $W_{n,k}$ and $L_k$ is an integer for identifying a region, among the four lattice point regions 51d and the four inter-lattice point regions 51e, associated with the values respectively represented by $W_{n,k}$ and $L_k$. There are for example one to 8 different integers as the integer. A subscript n attached to $W_{n,k}$ and $l_n$ is an integer for identifying a pixel, among the pixels in the central region 51b of the patch 51a, associated with the values respectively represented by $W_{n,k}$ and $l_n$. There are for example one to N different integers as the integer. N represents the number of pixels present in the central region 51b. The equation 5 represents interpolation referred to as inverse distance weighting. The inverse distance weighting is interpolation in which a lightness of a region closer to a target pixel has a greater influence on the predicted lightness of the target pixel.

$$l_n = \sum_{k=1}^{8} \left( \frac{W_{n,k}}{\sum_{k=1}^{8} W_{n,k}} \times L_k \right) \qquad \text{Equation 5}$$

Next, the table generating section 38a calculates a predicted lightness L' of each of the patches 51a in the picture in accordance with equation 6 assuming the patch 51a is a blank portion of the picture. In the equation 6, $l_n$ represents a result of calculating the equation 5. N represents the number of pixels present in the central region 51b.

$$L' = \frac{\sum_{n=1}^{N} l_n}{N} \qquad \text{Equation 6}$$

Although description has been given using the patches 51a, the same applies to the patches 61a.

Subsequent to S294, the table generating section 38a uses the predicted lightness calculated in S294 to calculate a predicted lightness-based weighting coefficient for each of the patches in the picture 70 as a weighting coefficient based on the predicted lightness of the patch assuming the patch is a blank portion of the picture 70 (S295). In the equation 7, LightWeight represents a predicted lightness-based weighting coefficient of a target patch. L' represents a predicted lightness of the target patch. $L_{ave}$ represents an average value of predicted lightnesses L' of all the patches in the picture. abs( ) is a function for determining an absolute value of a numerical value in the ( ).

$$LightWeight = \frac{1}{abs(L' - L_{ave})} \qquad \text{Equation 7}$$

Note that LightWeight in the equation 7 can be extremely large when abs(L'-$L_{ave}$) is near 0. LightWeight may therefore be provided with an upper limit.

Subsequent to completion of S295, the table generating section 38a ends the predicted lightness-based weighting coefficient calculating process illustrated in FIG. 17.

Subsequent to the predicted lightness-based weighting coefficient calculating process in S262, as illustrated in FIG. 16, the table generating section 38a ends the weighting coefficient calculating process illustrated in FIG. 16.

Subsequent to the weighting coefficient calculating process in S234, as illustrated in FIG. 15, the table generating section 38a calculates a representative value for each of the gradations of the color values of the patches in the test chart 51 and the reference chart 61 based on the color value variance-based weighting coefficient and the predicted lightness-based weighting coefficient calculated in the weighting coefficient calculating process in S234 (S235).

More specifically, as in the first embodiment, the table generating section 38a first calculates, for each of the gradations of the color values of the patches in the test chart 51 and the reference chart 61, a weighted average $RGB_s$ of the color values of a plurality of patches in the gradation in accordance with the equation 3 based on the color value variance-based weighting coefficient.

Next, the table generating section 38a calculates, for each of the gradations of the color values of the patches in the test chart 51 and the reference chart 61, a weighted average $RGB_l$ of the color values of a plurality of patches in the gradation in accordance with equation 8 based on the predicted lightness-based weighting coefficient. That is, the table generating section 38a calculates the weighted average $RGB_l$ for each of the gradations of the color values of the patches 51a in the test chart 51 and calculates the weighted average $RGB_l$ for each of the gradations of the color values of the patches 61a in the reference chart 61. In the equation 8, $LightWeight_m$ represents a predicted lightness-based weighting coefficient for each target patch that is calculated in S295. $RGB_m$ represents a lightness of each patch that is acquired in S133. A subscript m attached to $LightWeight_m$ and $RGB_m$ is an integer for identifying a patch, among the patches in a single gradation in the test chart 51 and the reference chart 61, associated with the values respectively represented by $LightWeight_m$ and $RGB_m$. There are for example one to M different integers as the integer. M represents the number of patches present in a single gradation in the test chart 51 and the reference chart 61. For example, in a case where the table generating section 38a calculates the weighted average $RGB_l$ of color values of the patches 51a in a specific gradation in the test chart 51, and the number of patches 51a in the gradation in the test chart 51 is 4, M is 4.

$$RGB_l = \frac{\sum (LightWeight_m \times RGB_m)}{\sum LightWeight_m} \qquad \text{Equation 8}$$

Next, the table generating section 38a calculates an average RGB of the weighted average $RGB_s$ and the weighted average $RGB_l$ in accordance with equation 9 as a representative value for each of the gradations of the color values of the patches in the test chart 51 and the reference chart 61. It is noted here that the table generating section 38a calculates the weighted average $RGB_s$ for each of the gradations of the color values of the patches in the test chart 51 and the reference chart 61 in accordance with the equation 3. It is also noted that the table generating section 38a calculates the weighted average $RGB_l$ for each of the gradations of the color values of the patches in the test chart 51 and the reference chart 61 in accordance with the equation 8. That is, the table generating section 38a calculates a representative value for each of the gradations of the color values of the patches 51a in the test chart 51 and calculates a representative value for each of the gradations of the color values of the patches 61a in the reference chart 61.

$$RGB = \frac{RGB_s + RGB_l}{2} \qquad \text{Equation 9}$$

Subsequent to S235, the table generating section 38a performs S136 to S138 and ends the gamma correction table generating process illustrated in FIG. 15 as in the gamma correction table generating process illustrated in FIG. 9.

As described above, even if the picture 70 includes a spot resulting from different lightnesses, the calibration system 10 according to the second embodiment performs weighting for each of the patches in the picture based on the variance of color values of the pixels in the patch and the predicted lightness of the patch assuming the patch is a blank portion of the picture (S235). Thus, the calibration system 10 can calculate a representative value for each of the gradations of the color values of the patches in the test chart 51 and the reference chart 61 with a high degree of accuracy. Accordingly, the influence of the spot resulting from different lightnesses in the picture on the result of correction of gradation characteristics can be reduced. Consequently, the calibration system according to the second embodiment can improve the accuracy of correction of gradation characteristics.

In the calibration system 10 according to the second embodiment, halation may occur or a shadow of an object of some sort such as a user may appear on the picture generated by the smartphone 20 depending on environmental conditions, such as an illumination condition, for capturing images of the test chart 51 and the reference chart 61. In a case where the predicted lightness of a portion including some patches is too high due to halation or the like or in a case where the predicted lightness of a portion including some patches is too low due to a shadow of an object of some sort appearing on a picture, the calibration system 10 calculates a representative value for each of the gradations of the color values of the patches while reducing the influence of the color values of the patches having a too high predicted lightness or a too low predicted lightness. Consequently, the calibration system 10 can improve the accuracy of the representative value for each of the gradations of the color values of the patches.

In the description of the calibration system 10 according to the second embodiment above, the gamma correction table generating process illustrated in FIG. 15 is performed by the MFP 30. However, as in the calibration system 10 according to the first embodiment, at least a part of the gamma correction table generating process may be performed by the smartphone 20 in the calibration system 10 according to the second embodiment.

Third Embodiment

The following describes the calibration system 10 according to a third embodiment of the present disclosure. A configuration of the calibration system 10 according to the third embodiment is the same as the configuration of the calibration system 10 according to the first embodiment. Accordingly, detailed description thereof is omitted.

Operation of the calibration system 10 according to the third embodiment is the same as the operation of the calibration system 10 according to the first embodiment or the operation of the calibration system 10 according to the second embodiment except steps described below.

First, description is given of a calibration method that is adopted in the calibration system 10 according to the third embodiment. The calibration system 10 according to the third embodiment performs a calibration method illustrated in FIG. 21 instead of the calibration method illustrated in FIG. 6.

Figure 21:
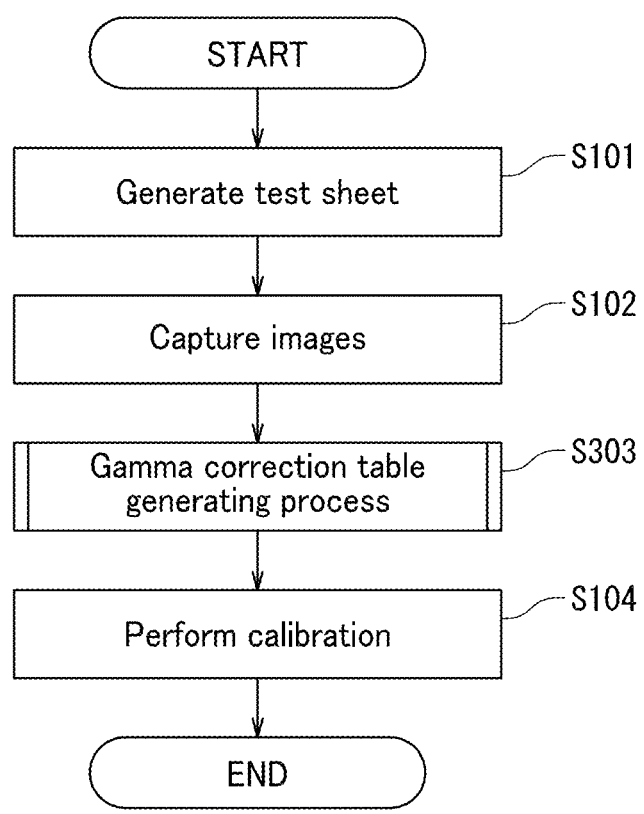
FIG. 21 is a flowchart of a calibration method that is adopted in a calibration system according to a third embodiment of the present disclosure.

FIG. 21 is a flowchart of the calibration method that is adopted in the calibration system 10 according to the third embodiment.

In the calibration method that is adopted in the calibration system 10 according to the third embodiment, S101 and S102 are performed in the same manner as in S101 and S102 illustrated in FIG. 6 that are performed by the calibration system 10 according to the first embodiment.

Figure 22:
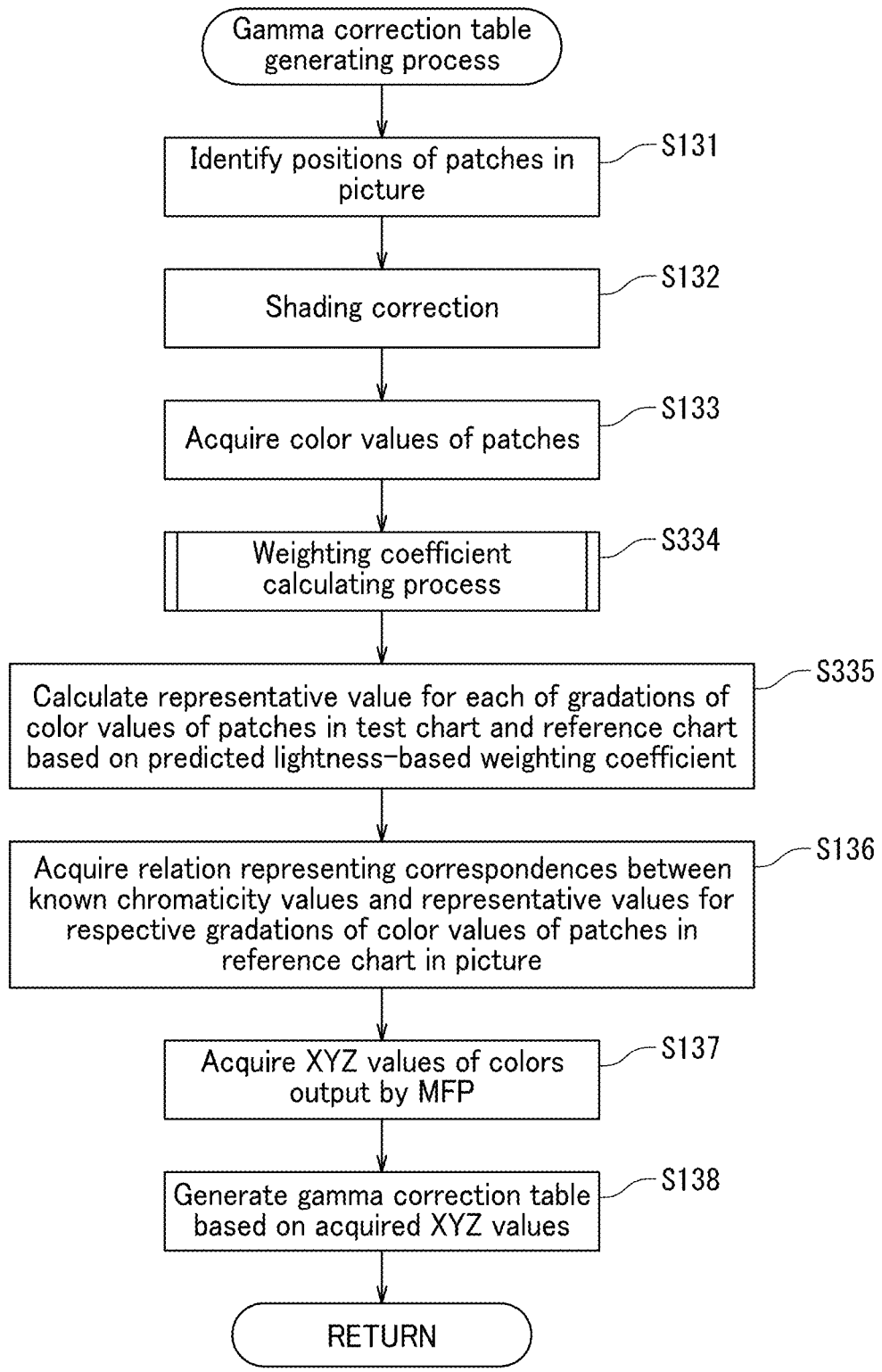
FIG. 22 is a flowchart of a gamma correction table generating process illustrated in FIG. 21.

Subsequent to S102, as illustrated in FIG. 21, the table generating section 38a of the MFP 30 performs a gamma correction table generating process illustrated in FIG. 22 based on a picture transmitted from the smartphone 20 (S303).

FIG. 22 is a flowchart of the gamma correction table generating process illustrated in FIG. 21.

As illustrated in FIG. 22, the table generating section 38a according to the third embodiment performs S131 to S133 in the same manner as in the gamma correction table generating process illustrated in FIG. 15, that is, as in the gamma correction table generating process that is performed by the table generating section 38a according to the second embodiment.

Subsequent to S133, the table generating section 38a performs a weighting coefficient calculating process of calculating a weighting coefficient for calculating a representative value for each of the gradations of the color values of the patches in the test chart 51 and the reference chart 61 in the picture 70 (S334).

The table generating section 38a according to the third embodiment performs the weighting coefficient calculating process illustrated in FIG. 17 as in the table generating section 38a according to the second embodiment.

Subsequent to completion of S295, the table generating section 38a ends the weighting coefficient calculating process illustrated in FIG. 17.

Subsequent to weighting coefficient calculating process in S334, as illustrated in FIG. 22, the table generating section 38a calculates a representative value for each of the gradations of the color values of the patches in the test chart 51 and the reference chart 61 based on the predicted lightness-based weighting coefficient calculated in the weighting coefficient calculating process in S334 (S335).

More specifically, the table generating section 38a calculates, as a representative value for each of the gradations of the color values of the patches in the test chart 51 and the reference chart 61, a weighted average $RGB_1$ of the color values of a plurality of patches in the gradation based on the predicted lightness-based weighting coefficient in accordance with the equation 5 described for the second embodiment. That is, the table generating section 38a calculates, as the representative value, the weighted average $RGB_1$ for each of the gradations of the color values of the patches 51a in the test chart 51 and calculates, as the representative value, the weighted average $RGB_1$ for each of the gradations of the color values of the patches 61a in the reference chart 61.

Subsequent to S335, the table generating section 38a performs S136 to S138 and ends the gamma correction table generating process illustrated in FIG. 22 as in the gamma correction table generating process illustrated in FIG. 9.

Subsequent to the gamma correction table generating process in S303, as illustrated in FIG. 21, the controller 38 performs S104 in the same manner as in the calibration method illustrated in FIG. 6 and ends the calibration method illustrated in FIG. 21.

As described above, even if the picture 70 includes a spot resulting from different lightnesses, the calibration system 10 according to the third embodiment performs weighting for each of the patches in the picture based on the predicted lightness of the patch assuming the patch is a blank portion of the picture (S335). Thus, the calibration system 10 can calculate a representative value for each of the gradations of the color values of the patches in the test chart 51 and the reference chart 61 with a high degree of accuracy. Accordingly, the influence of the spot resulting from different lightnesses in the picture 70 on the result of correction of gradation characteristics can be reduced. Consequently, the calibration system 10 can improve the accuracy of correction of gradation characteristics.

In the calibration system 10, halation may occur depending on environmental conditions, such as an illumination condition, for capturing images of the test chart 51 and the reference chart 61. In a case where the predicted lightness of a portion including some patches is too high due to halation or the like or in a case where the predicted lightness of a portion including some patches is too low due to a shadow of an object of some sort appearing on a picture, the calibration system 10 calculates a representative value for each of the gradations of the color values of the patches while reducing the influence of the color values of the patches having a too high predicted lightness or a too low predicted lightness. Thus, the calibration system 10 can improve the accuracy of the representative value for each of the gradations of the color values of the patches.

The calibration system 10 calculates the representative values (S335) after performing shading correction (S132) and thus reducing the significance of a spot resulting from different lightnesses in a picture depending on properties of the smartphone 20. The calibration system 10 can therefore further reduce the influence of the spot resulting from different lightnesses in the picture 70 on the result of correction of gradation characteristics. Consequently, the calibration system 10 can further improve the accuracy of correction of gradation characteristics.

Since the MFP 30 in the calibration system 10 includes the table generating section 38a, the imaging device does not need to include a table generating section. Accordingly, the imaging device that is used in the calibration system 10 does not need to be a highly capable device such as the smartphone 20. Consequently, an ordinary imaging device can be used in the calibration system 10, improving usability.

In the description of the calibration system 10 above, S303 is performed by the MFP 30. Alternatively, at least a part of S303 may be performed by the smartphone 20. For example, in a case where S303 is entirely performed by the smartphone 20, the controller 26 of the smartphone 20 functions as the table generating section 26a that generates a gamma correction table for correcting gradation characteristics of the MFP 30 as illustrated in FIG. 14. In such a case, the controller 26 of the smartphone 20 transmits the gamma correction table generated by the table generating section 26a to the MFP 30. The MFP 30 does not need to include a table generating section as long as S303 is entirely performed by the smartphone 20. Consequently, the processing burden on the MFP 30 for updating the gamma correction table 37b can be reduced.

Fourth Embodiment

A configuration of a calibration system according to a fourth embodiment of the present disclosure is the same as the configuration of the calibration system according to the first embodiment. Accordingly, detailed description thereof is omitted.

Operation of the calibration system according to the fourth embodiment is the same as the operation of the calibration system according to the first embodiment, the operation of the calibration system according to the second embodiment, and the operation of the calibration system according to the third embodiment except steps described below.

Figure 23:
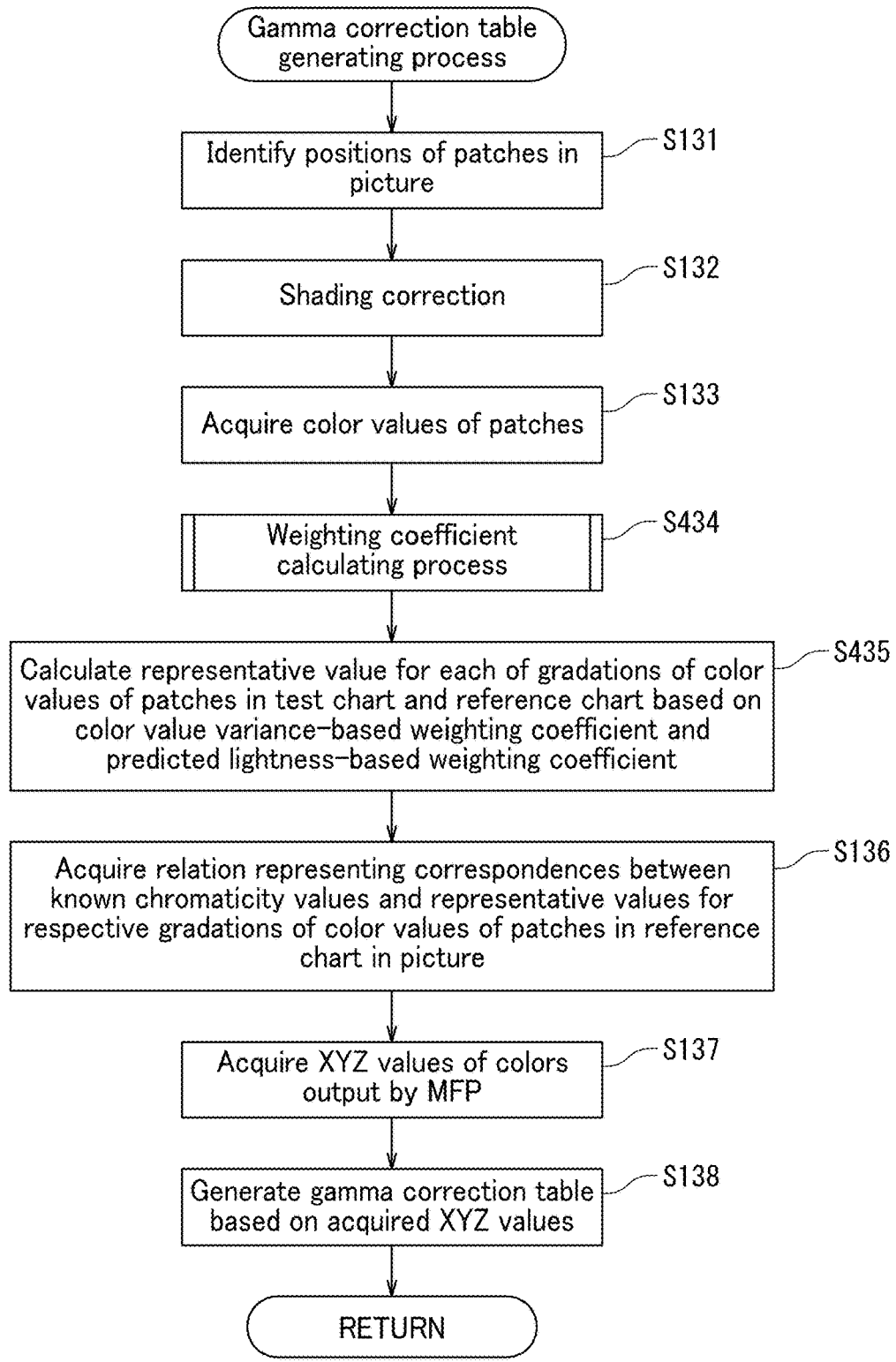
FIG. 23 is a flowchart of a gamma correction table generating process that is performed by a calibration system according to a fourth embodiment of the present disclosure.

The calibration system according to the fourth embodiment performs a process illustrated in FIG. 23 instead of the process illustrated in FIG. 9, the process illustrated in FIG. 15, and the process illustrated in FIG. 22.

FIG. 23 is a flowchart of a gamma correction table generating process that is performed by the calibration system 10 according to the fourth embodiment.

As illustrated in FIG. 23, the table generating section 38a performs S131 to S133 as in the gamma correction table generating process illustrated in FIG. 9.

Subsequent to S133, the table generating section 38a performs a weighting coefficient calculating process of calculating a weighting coefficient for calculating a representative value for each of the gradations of the color values of the patches in the test chart 51 and the reference chart 61 in the picture (S434).

Figure 24:
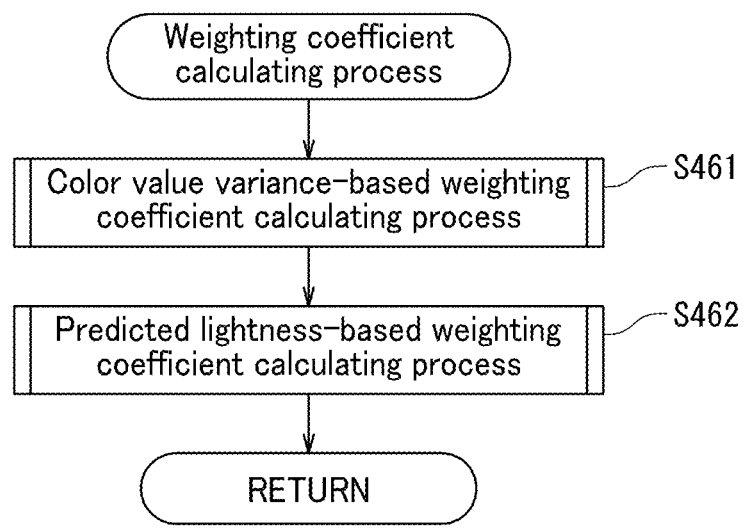
FIG. 24 is a flowchart of a weighting coefficient calculating process illustrated in FIG. 23.

FIG. 24 is a flowchart of the weighting coefficient calculating process illustrated in FIG. 23.

As illustrated in FIG. 24, the table generating section 38a performs a color value variance-based weighting coefficient calculating process of calculating a weighting coefficient based on the variance of color values of the pixels in each of the patches in the picture (S461).

The table generating section 38a according to the fourth embodiment performs S161 and S162 in the same manner as in the color value variance-based weighting coefficient calculating process illustrated in FIG. 11, that is, as in the color value variance-based weighting coefficient calculating process that is performed by the table generating section 38a according to the first embodiment.

Subsequent to completion of S162, the table generating section 38a ends the color value variance-based weighting coefficient illustrated in FIG. 11.

Subsequent to the color value variance-based weighting coefficient calculating process in S461, as illustrated in FIG. 24, the table generating section 38a performs a predicted lightness-based weighting coefficient calculating process of calculating a weighting coefficient based on a predicted lightness (S462). The predicted lightness-based weighting coefficient is a weighting coefficient based on a predicted lightness of each of the patches in the picture 70 assuming the patch is a blank portion of the picture 70. The predicted lightness-based weighting coefficient calculating process is performed in the same manner as in the weighting coefficient calculating process illustrated in FIG. 17.

Subsequent to the predicted lightness-based weighting coefficient calculating process in S462, the table generating section 38a ends the weighting coefficient calculating process illustrated in FIG. 24.

Subsequent to the weighting coefficient calculating process in S434, as illustrated in FIG. 23, the table generating section 38a calculates a representative value for each of the gradations of the color values of the patches in the test chart 51 and the reference chart 61 based on the color value variance-based weighting coefficient and the predicted lightness-based weighting coefficient calculated in the weighting coefficient calculating process in S434 (S435).

More specifically, the table generating section 38a first calculates, for each of the gradations of the color values of the patches in the test chart 51 and the reference chart 61, a weighted average $RGB_s$ of the color values of a plurality of patches in the gradation in accordance with the equation 3 described for the first embodiment based on the color value variance-based weighting coefficient. That is, the table generating section 38*a* calculates the weighted average $RGB_s$ for each of the gradations of the color values of the patches 51*a* in the test chart 51 and calculates the weighted average $RGB_s$ for each of the gradations of the color values of the patches 61*a* in the reference chart 61.

Next, the table generating section 38*a* calculates, for each of the gradations of the color values of the patches in the test chart 51 and the reference chart 61, a weighted average $RGB_1$ of the color values of a plurality of patches in the gradation in accordance with the equation 8 based on the predicted lightness-based weighting coefficient as in the first embodiment.

Next, in accordance with the equation 9 described for the second embodiment, the table generating section 38*a* calculates, as a representative value for each of the gradations of the color values of the patches in the test chart 51 and the reference chart 61, an average RGB of the weighted average $RGB_s$ calculated for the gradation in accordance with the equation 3 and the weighted average $RGB_1$ calculated for the gradation in accordance with the equation 8. That is, the table generating section 38*a* calculates a representative value for each of the gradations of the color values of the patches 51*a* in the test chart 51 and calculates a representative value for each of the gradations of the color values of the patches 61*a* in the reference chart 61.

Subsequent to S435, as illustrated in FIG. 23, the table generating section 38*a* performs S136 to S138 in the same manner as in the gamma correction table generating process illustrated in FIG. 9 and ends the gamma correction table generating process illustrated in FIG. 23.

As described above, even if the picture includes a spot resulting from different lightnesses, the calibration system according to the fourth embodiment performs weighting for each of the patches in the picture based on the variance of color values of the pixels in the patch and the predicted lightness of the patch assuming the patch is a blank portion of the picture (S435). Thus, the calibration system can calculate a representative value for each of the gradations of the color values of the patches in the test chart 51 and the reference chart 61 with a high degree of accuracy. Accordingly, the influence of the spot resulting from different lightnesses in the picture on the result of correction of gradation characteristics can be reduced. Consequently, the calibration system according to the fourth embodiment can improve the accuracy of correction of gradation characteristics.

In the calibration system 10 according to the fourth embodiment, halation may occur depending on environmental conditions, such as an illumination condition, for capturing images of the test chart 51 and the reference chart 61. In a case where halation or the like occurs in the calibration system 10, and the lightness of a portion including some patches increases to be higher than an originally intended lightness due to the halation or the like, the likelihood of the portion having a higher lightness than the originally intended lightness being influenced by noise introduced in the picture during the image capture by the smartphone 20 increases with increase in the lightness. That is, a variance (dispersion) in each of the patches having a higher lightness than the originally intended lightness increases. The calibration system according to the fourth embodiment therefore calculates a representative value for each of the gradations of the color values of the patches while reducing the influence of the color values of the patches in which the variance of color values of the pixels is too high, that is, the patches having a higher lightness than the originally intended lightness. Thus, the calibration system can improve the accuracy of the representative value for each of the gradations of the color values of the patches.

In the calibration system 10 according to the fourth embodiment, a shadow of an object of some sort such as a user may appear on the picture generated by the smartphone 20 depending on environmental conditions for capturing images of the test chart 51 and the reference chart 61. In a case where a shadow of an object of some sort appears on the picture generated by the smartphone 20 in the calibration system 10, and the lightness of a portion including some patches increases to be lower than an originally intended lightness due to the shadow, the likelihood of the portion having a lower lightness than the originally intended lightness being influenced by noise introduced in the picture during the image capture by the smartphone 20 decreases with decrease in the lightness. That is, a variance (dispersion) in each of the patches having a lower lightness than the originally intended lightness decreases. The calibration system according to the fourth embodiment therefore calculates a representative value for each of the gradations of the color values of the patches while reducing the influence of the color values of the patches in which the variance of color values of the pixels is too low, that is, the patches having a lower lightness than the originally intended lightness. Thus, the calibration system can improve the accuracy of the representative value for each of the gradations of the color values of the patches.

In the description of the calibration system according to the fourth embodiment above, the gamma correction table generating process illustrated in FIG. 23 is performed by the MFP 30. Alternatively, at least a part of the gamma correction table generating process may be performed by the smartphone 20 as in the calibration system 10 according to the first embodiment.

The image forming apparatus according to the embodiments of the present disclosure described above is an MFP but may be any image forming apparatuses other than MFPs. For example, the image forming apparatus according to the embodiments of the present disclosure may be an image forming apparatus such as a dedicated printer, a dedicated copier, or a dedicated facsimile machine.

The imaging device according to the embodiments of the present disclosure described above is a smartphone but may be any imaging devices other than smartphones. For example, the imaging device according to the embodiments of the present disclosure may be an imaging device such as a digital camera.

What is claimed is:
1. A calibration system comprising:
an imaging device; and
an image forming apparatus,
the image forming apparatus including:
a printer;
a Central Processing Unit (CPU) as a controller; and
a storage device including
(i) a calibration program,
(ii) test chart image data being image data of a test chart containing patches of a plurality of colors, and
(iii) reference chromaticity value information, wherein
- the printer prints the following (i) and (ii) on a test sheet:
  - (i) the test chart based on the test chart image data; and
  - (ii) a border that indicates a position on the test sheet in which a reference chart is to be placed, the reference chart being not printed by the printer and being more accurate than the test chart in RGB values as color values,
- the CPU as the controller executes the calibration program to function as a table generating section that generates a gamma correction table for correcting gradation characteristics of the image forming apparatus to gradation characteristics in accordance with the reference chart containing patches of a plurality of colors corresponding to the colors of the patches in the test chart, and
- the imaging device captures an image of the reference chart and an image of the test chart on the test sheet together to generate a picture by capturing an image of the test sheet with the reference chart placed within the border on the test sheet,
- wherein the table generating section performs a gamma correction table generating process on the picture transmitted from the imaging device, and
- wherein the gamma correction table generating process comprises:
- identifying positions of the patches in the test chart in the picture and the patches in the reference chart in the picture;
- performing shading correction on the picture;
- acquiring the RGB values of the patches whose positions are identified;
- performing a weighting coefficient calculating process for calculating a weighting coefficient;
  - calculating, based on the weighting coefficient calculated through the weighting coefficient calculating process, a representative value for each of gradations of the RGB values of the patches in the test chart in the picture and a representative value for each of gradations of the RGB values of the patches in the reference chart in the picture;
- acquiring a relational expression between XYZ values acquired from the reference chromaticity value information and the representative value for each of the gradations of the RGB values of the patches in the reference chart, the XYZ values indicating chromaticity values of the patches in the reference chart;
- acquiring XYZ values indicating chromaticity values of the patches in the test chart by assigning the representative value for each of the gradations of the RGB values of the patches in the test chart to the acquired relational expression; and
- generating the gamma correction table based on differences between the XYZ values of the patches in the test chart and the XYZ values of the patches in the reference chart.

2. The calibration system according to claim 1, wherein the weighting coefficient calculated through the weighting coefficient calculating process includes a color value variance-based weighting coefficient based on a variance of the RGB values of pixels in each of the patches in the picture.

3. The calibration system according to claim 1, wherein the weighting coefficient calculated through the weighting coefficient calculating process includes a predicted lightness-based weighting coefficient based on a predicted lightness of each of the patches in the picture assuming the patch is a blank portion of the picture.

4. The calibration system according to claim 1, wherein the weighting coefficient calculated through the weighting coefficient calculating process includes both
- (i) a color value variance-based weighting coefficient based on a variance of the RGB values of pixels in each of the patches in the picture and
- (ii) a predicted lightness-based weighting coefficient based on a predicted lightness of each of the patches in the picture assuming the patch is a blank portion of the picture.

5. A calibration method comprising:
- printing, by an image forming apparatus, the following (i) and (ii) on a test sheet:
  - (i) a test chart containing patches of a plurality of colors based on test chart image data stored in the image forming apparatus; and
  - (ii) a boarder that indicates a position on the test sheet in which a reference chart is to be placed, the reference chart being not printed by the image forming apparatus and being more accurate than the test chart in RGB values as color values;
- capturing, by an imaging device, an image of the reference chart and an image of the test chart on the test sheet together to generate a picture by capturing an image of the test sheet with the reference chart placed within the border on the test sheet, the reference chart containing patches of a plurality of colors corresponding to the colors of the patches in the test chart; and
- performing a gamma correction table generating process on the picture transmitted from the imaging device;
- wherein the gamma correction table generating process comprises:
- identifying positions of the patches in the test chart in the picture and the patches in the reference chart in the picture;
- performing shading correction on the picture;
- acquiring the RGB values of the patches whose positions are identified;
- performing a weighting coefficient calculating process for calculating a weighting coefficient;
  - calculating, based on the weighting coefficient calculated through the weighting coefficient calculating process, a representative value for each of gradations of the RGB values of the patches in the test chart in the picture and a representative value for each of gradations of the RGB values of the patches in the reference chart in the picture;
- acquiring a relational expression between XYZ values acquired from the reference chromaticity value information stored in the image forming apparatus and the representative value for each of the gradations of the RGB values of the patches in the reference chart, the XYZ values indicating chromaticity values of the patches in the reference chart;
- acquiring XYZ values indicating chromaticity values of the patches in the test chart by assigning the representative value for each of the gradations of the RGB values of the patches in the test chart to the acquired relational expression; and
- generating the gamma correction table based on differences between the XYZ values of the patches in the test chart and the XYZ values of the patches in the reference chart.

6. The calibration method according to claim 5, wherein the weighting coefficient calculated through the weighting coefficient calculating process includes a color value variance-based weighting coefficient based on a variance of the RGB values of pixels in each of the patches in the picture.

7. The calibration method according to claim 5, wherein the weighting coefficient calculated through the weighting coefficient calculating process includes a predicted lightness-based weighting coefficient based on a predicted lightness of each of the patches in the picture assuming the patch is a blank portion of the picture.

8. The calibration method according to claim 5, wherein the weighting coefficient calculated through the weighting coefficient calculating process includes both
   (i) a color value variance-based weighting coefficient based on a variance of the RGB values of pixels in each of the patches in the picture and
   (ii) a predicted lightness-based weighting coefficient based on a predicted lightness of each of the patches in the picture assuming the patch is a blank portion of the picture.

9. An image forming apparatus comprising:
   a printer;
   a Central Processing Unit (CPU) as a controller; and
   a storage device including
   (i) a calibration program,
   (ii) test chart image data being image data of a test chart containing patches of a plurality of colors, and
   (iii) reference chromaticity value information,
   wherein
      the printer prints the following (i) and (ii) on a test sheet:
         (i) the test chart based on the test chart image data; and
         (ii) a border that indicates a position on the test sheet in which a reference chart is to be placed, the reference chart being not printed by the printer and being more accurate than the test chart in RGB values as color values,
      the CPU as the controller executes the calibration program to function as a table generating section that generates a gamma correction table for correcting gradation characteristics of the image forming apparatus to gradation characteristics in accordance with the reference chart containing patches of a plurality of colors corresponding to the colors of the patches in the test chart,
   wherein the table generating section performs a gamma correction table generating process on the picture transmitted from the imaging device, the picture being generated by capturing an image of the test sheet with the reference chart placed within the border on the test sheet by the imaging device,
   wherein the gamma correction table generating process comprises:
      identifying positions of the patches in the test chart in the picture and the patches in the reference chart in the picture;
      performing shading correction on the picture;
      acquiring the RGB values of the patches whose positions are identified;
      performing a weighting coefficient calculating process for calculating a weighting coefficient;
         calculating, based on the weighting coefficient calculated through the weighting coefficient calculating process, a representative value for each of gradations of the RGB values of the patches in the test chart in the picture and a representative value for each of gradations of the RGB values of the patches in the reference chart in the picture;
      acquiring a relational expression between XYZ values acquired from the reference chromaticity value information and the representative value for each of the gradations of the RGB values of the patches in the reference chart, the XYZ values indicating chromaticity values of the patches in the reference chart;
      acquiring XYZ values indicating chromaticity values of the patches in the test chart by assigning the representative value for each of the gradations of the RGB values of the patches in the test chart to the acquired relational expression; and
      generating the gamma correction table based on differences between the XYZ values of the patches in the test chart and the XYZ values of the patches in the reference chart.

10. The image forming apparatus according to claim 9, wherein
   the weighting coefficient calculated through the weighting coefficient calculating process includes a color value variance-based weighting coefficient based on a variance of the RGB values of pixels in each of the patches in the picture.

11. The image forming apparatus according to claim 9, wherein
   the weighting coefficient calculated through the weighting coefficient calculating process includes a predicted lightness-based weighting coefficient based on a predicted lightness of each of the patches in the picture assuming the patch is a blank portion of the picture.

12. The image forming apparatus according to claim 9, wherein
   the weighting coefficient calculated through the weighting coefficient calculating process includes both
   (i) a color value variance-based weighting coefficient based on a variance of the RGB values of pixels in each of the patches in the picture and
   (ii) a predicted lightness-based weighting coefficient based on a predicted lightness of each of the patches in the picture assuming the patch is a blank portion of the picture.

* * * * *